United States Patent
Salem et al.

(10) Patent No.: US 9,591,564 B2
(45) Date of Patent: Mar. 7, 2017

(54) METHODS FOR DYNAMIC TRAFFIC OFFLOADING AND TRANSMIT POINT (TP) MUTING FOR ENERGY EFFICIENCY IN VIRTUAL RADIO ACCESS NETWORK (V-RAN)

(71) Applicant: Huawei Technologies Co., Ltd., Shenzhen (CN)

(72) Inventors: Mohamed Salem, Kanata (CA); Mohammadhadi Baligh, Kanata (CA)

(73) Assignee: Huawei Technologies Co., Ltd., Shenzhen (CN)

(*) Notice: Subject to any disclaimer, the term of this patent is extended or adjusted under 35 U.S.C. 154(b) by 154 days.

(21) Appl. No.: 14/667,497

(22) Filed: Mar. 24, 2015

(65) Prior Publication Data

US 2015/0282070 A1    Oct. 1, 2015

Related U.S. Application Data

(60) Provisional application No. 61/973,119, filed on Mar. 31, 2014.

(51) Int. Cl.
H04W 4/00 (2009.01)
H04W 52/02 (2009.01)
(Continued)

(52) U.S. Cl.
CPC ........ *H04W 52/0206* (2013.01); *H04W 48/20* (2013.01); *H04W 72/12* (2013.01); *Y02B 60/50* (2013.01)

(58) Field of Classification Search
CPC combination set(s) only.
See application file for complete search history.

(56) References Cited

U.S. PATENT DOCUMENTS 8,311,002 B2 * 11/2012 Nyberg ............. H04W 72/1284
                                                                 370/329
9,357,483 B2 *  5/2016 Gao ................. H04W 52/0206
(Continued)

FOREIGN PATENT DOCUMENTS

| CN | 103281730 A | 9/2013 |
| CN | 103250396 A | 8/2014 |
| WO | 2013125919 A1 | 8/2013 |

OTHER PUBLICATIONS

Auer, G., et al., "How Much Energy is Needed to Run a Wireless Network?," Technologies for Green Radio Communication Networks, IEEE Wireless Communications, Oct. 2011, pp. 40-49.
(Continued)

*Primary Examiner* — Frank Duong
(74) *Attorney, Agent, or Firm* — Slater Matsil, LLP

(57) ABSTRACT

Energy efficient scheduling can be achieved by computing scheduling assignments in accordance with a transmit point (TP) muting utility. More specifically, candidate scheduling assignments that mute different combinations of transmit points are evaluated to determine which offers the highest utility. A greedy approach can be used to evaluate the candidate scheduling assignments in order to reduce the computational complexity of the scheduler. For example, a set of scheduling assignments may be evaluated during each iteration in a sequence of iterations, with each scheduling assignment muting a different one of the remaining TPs. At the end of each iteration, the scheduling assignment providing the highest utility is selected, and the TP muted by that scheduling assignment is muted during all succeeding iterations.

28 Claims, 22 Drawing Sheets

(51) Int. Cl.
H04W 48/20 (2009.01)
H04W 72/12 (2009.01)

(56) References Cited

U.S. PATENT DOCUMENTS

2013/0173802 A1* 7/2013 Saffre .................. G06F 1/3209
709/226
2014/0317232 A1 10/2014 Wang et al.
2015/0049623 A1* 2/2015 Yuk ...................... H04W 36/30
370/252

OTHER PUBLICATIONS

Chen, Y., et al., "Energy Saving: Scaling Network Energy Efficiency Faster than Traffic Growth," 2013 IEEE WCNC Workshop on Future gReen End-to-End Wireless Network, pp. 12-17.

Dao, N-D, et al., "Downlink Transmission Optimization Framework," 2012 IEEE Vehicular Technology Conference (VTC Fall), 5 pages.

Frenger, P., et al., "Reducing Energy Consumption in LTE with Cell DTX," 2011 IEEE 73rd Vehicular Technology Conference (VTC Spring), 5 pages.

Han, S., et al., "Traffic-Aware Base Station Doze in Cooperative Multicell Systems," 2013 IEEE China Summit & International Conference on Signal and Information Processing (China SIP), pp. 394-398.

Nakamura, T., "LTE Enhancements and Future Radio Access," The 5th Future of Wireless International Conference, Jul. 1-2, 2013, 15 pages.

Xiong, C., et al., "Energy-Efficient Resource Allocation in OFDMA Networks," IEEE Transactions on Communications, vol. 60, No. 12, Dec. 2012, pp. 3767-3778.

Yu, W., et al., "Multicell Coordination via Joint Scheduling, Beamforming, and Power Spectrum Adaptation," IEEE Transactions on Wireless Communications, vol. 12, No. 7, Jul. 2013, pp. 3300-3313.

Salem, et al. "Dynamic Traffic Offloading and Transmit Point Muting for Energy and Cost Efficiency in Virtualized Radio Access Networks," IEEE 81st Vehicular Technology Conference (VTC Spring, 2015), pp. 1-5.

* cited by examiner

| BASE STATION MODELS | POWER CONSUMPTION VALUE [W] | | |
| --- | --- | --- | --- |
| | A | B | C |
| R1-114336 MACRO | 450 | 260 | 150 |
| R1-114336 PICO | 97.7 | 96.2 | 62 |
| FUTURE MACRO BASED ON EARTH IMPROVEMENTS | 225 | 85 | 34 |
| FUTURE PICO BASED ON EARTH IMPROVEMENTS | 91 | 69 | 23 |

METHODS FOR DYNAMIC TRAFFIC OFFLOADING AND TRANSMIT POINT (TP) MUTING FOR ENERGY EFFICIENCY IN VIRTUAL RADIO ACCESS NETWORK (V-RAN)

This patent application claims priority to U.S. Provisional Application No. 61/973,119, filed on Mar. 31, 2014 and entitled "Methods for Dynamic Traffic Offloading and Transmit Point (TP) Muting for Energy Efficiency in Virtual Radio Access Network (V-RAN)," which is hereby incorporated by reference herein as if reproduced in its entirety.

TECHNICAL FIELD

The present invention relates to green wireless communications, and, in particular embodiments, to methods for dynamic traffic offloading and transmit point (TP) muting for energy efficiency in virtual radio access network (V-RAN).

BACKGROUND

Mobile network operators may often incur high operational expenses due to the power requirements of base stations. For example, base stations may typically consume as much as eighty percent of the energy required to operate a cellular network, and may constitute a significant portion of the cellular network's carbon footprint. One strategy for improving efficiency is referred to as transmit point (TP) muting, where base stations that are not serving UEs can be transitioned from an active mode to 'sleep' (dormant) mode. Techniques for implementing TP muting in wireless networks having high access point (AP) densities are desired.

SUMMARY OF THE INVENTION

Technical advantages are generally achieved, by embodiments of this disclosure which describe methods for dynamic traffic offloading and transmit point (TP) muting for energy efficiency in virtual radio access network (V-RAN).

In accordance with an embodiment, a method for energy efficient scheduling through transmit point (TP) wideband muting is provided. In this example, the method includes determining an initial scheduling assignment for a cloud radio access network (CRAN) comprising a plurality of access points (APs). The initial scheduling assignment assigns a plurality of user equipments (UEs) to the APs during a time interval. The method further includes selecting, from the plurality of APs, at least a first AP to operate in a sleep mode during the time interval. The first AP is wideband muted when operating in the sleep mode. The initial scheduling assignment assigns a first subset of UEs to the first AP during the time interval. The method further includes re-assigning the first subset of UEs to other APs in the plurality of APs during the time interval, thereby obtaining a modified scheduling assignment, and prompting the plurality of APs to operate in accordance with the modified assignment during the time interval. The first AP operates in a sleep mode during the time interval. An apparatus for performing this method is also provided.

In accordance with another embodiment, another method for energy efficient scheduling through wideband transmit point (TP) muting is provided. In this example, the method includes receiving, by a scheduling device, energy parameters from a plurality of access points (APs). The energy parameters indicate an energy type used by each of the plurality of APs during a time interval. The method further includes determining a scheduling assignment in accordance with the energy parameters communicated by the APs. The scheduling assignment assigns a plurality of user equipments (UEs) to the plurality of APs during the time interval. Determining the scheduling assignment includes selecting, from the plurality of APs, at least a first AP to operate in a sleep mode during the time interval in accordance with the energy parameters. The method further includes prompting the plurality of APs to operate in accordance with the scheduling assignment during the time interval. The first AP operates in a sleep mode during the time interval. An apparatus for performing this method is also provided.

In accordance with another embodiment, a method for low complexity scheduling with wideband transmit point (TP) muting is provided. In this example, the method includes computing a first set of scheduling assignments for a cloud radio access network (CRAN) comprising a plurality of access points (APs). The first set of scheduling assignments assign a plurality of user equipments (UEs) to the plurality of APs during a time interval. Each scheduling assignment in the first set of scheduling assignments mutes a different one of the plurality of APs during the time interval. The method further includes determining that a first scheduling assignment has a higher utility than other scheduling assignments in the first set of scheduling assignments. The first scheduling assignment specifies that a first AP operates in an sleep mode while remaining APs in the plurality of APs operate in an active mode, with remaining APs in the plurality of APs forming a first subset of APs. The method further includes computing a second set of scheduling assignments for assigning the UEs to the APs during the time interval. Each scheduling assignment in the second set of scheduling assignments mutes a different AP in the first subset of APs in addition to muting the first AP. The method further includes determining that a second scheduling assignment in the second set of scheduling assignment has a higher utility than other scheduling assignments in the second set of scheduling assignments. The second scheduling assignment specifies that a second AP in the first subset of APs operates in a sleep mode while remaining APs in the first subset of APs operate in an active mode, with remaining APs in the first subset of APs forming a second subset of APs. The method further includes prompting the plurality of APs to operate in accordance with the second scheduling assignment when a utility of the second scheduling assignment exceeds a utility of the first scheduling assignment by less than a threshold. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In conventional networks, TP muting is typically used in a passive fashion, in which transitioning access points into a sleep/dormant state is an after-thought to performance-based scheduling. More specifically, conventional networks may independently compute scheduling assignments to achieve specific performance criteria (e.g., throughput, etc.), and then transition those access points that are not assigned any active UEs by the independently computed scheduling assignments into a sleep mode. The degree to which these passive TP muting strategies increase the network's energy efficiency is constrained by the fact that TP muting is typically not a criteria for performance-based scheduling Aspects of this disclosure provide techniques that compute scheduling assignments in accordance with a TP muting utility. More specifically, candidate scheduling assignments that mute different combinations of access points are evaluated to determine which offers the highest utility. In some embodiments, this is achieved using a greedy approach to reduce the computational complexity of the scheduler. For example, a set of scheduling assignments may be evaluated during each iteration in a sequence of iterations, with each scheduling assignment muting a different one of the remaining APs. At the end of each iteration, the scheduling assignment providing the highest utility is selected, and the AP muted by that scheduling assignment is muted during all succeeding iterations. Accordingly, scheduling assignments evaluated in later iterations will mute the APs specified by scheduling assignment selected in previous iterations. In this way, the set of scheduling assignments computed in subsequent iterations may be a subset of the scheduling assignments selected in the preceding iterations. These and other aspects of described in greater detail below.

Figure 1:
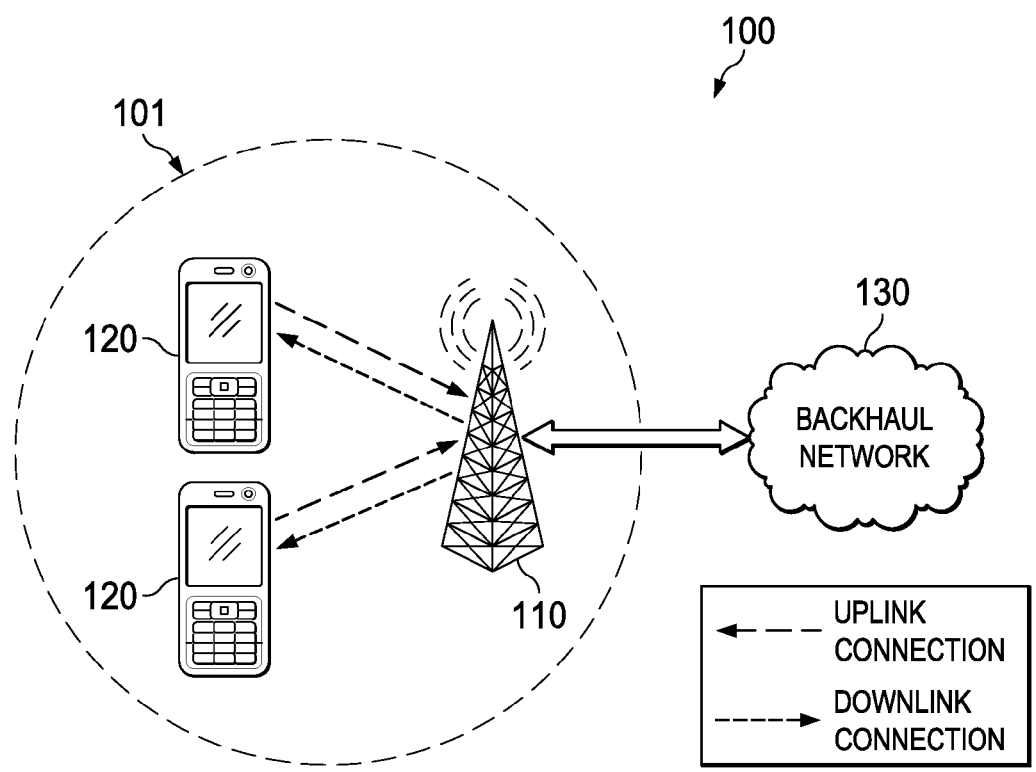
FIG. 1 illustrates a diagram of an embodiment wireless communications network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2A:
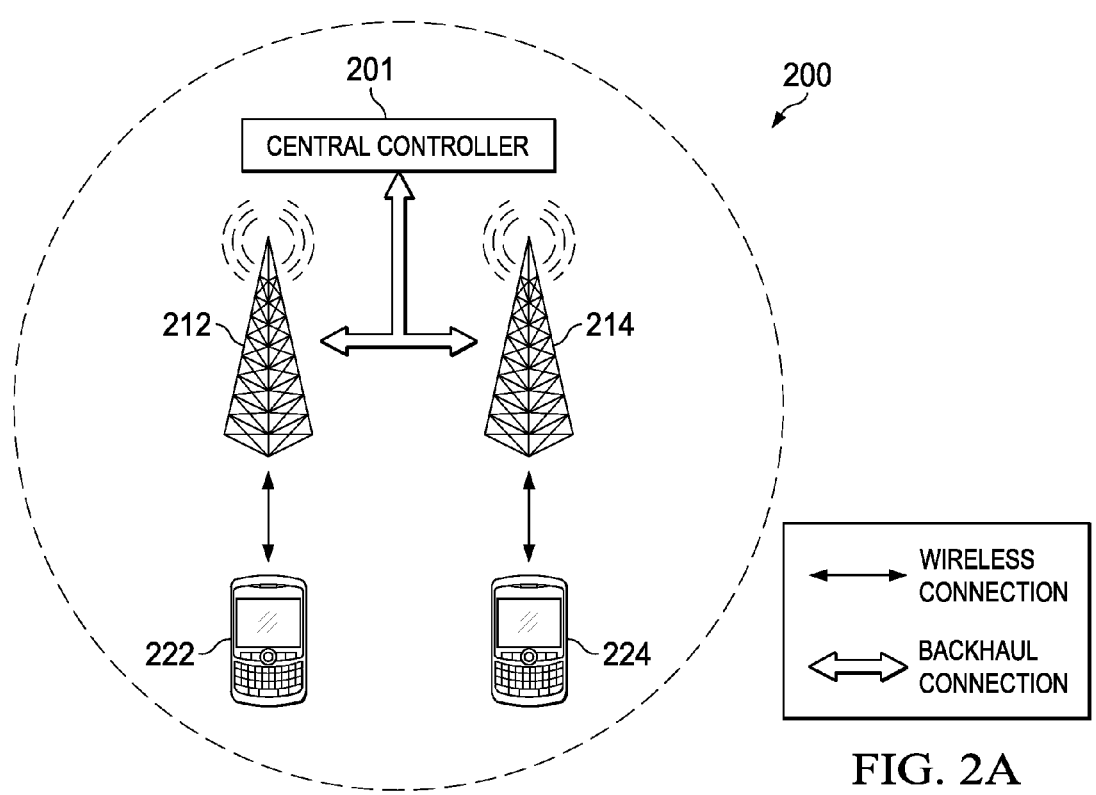
FIGS. 2A and 2B illustrate a diagram of an embodiment network architecture.
Figure 2B:
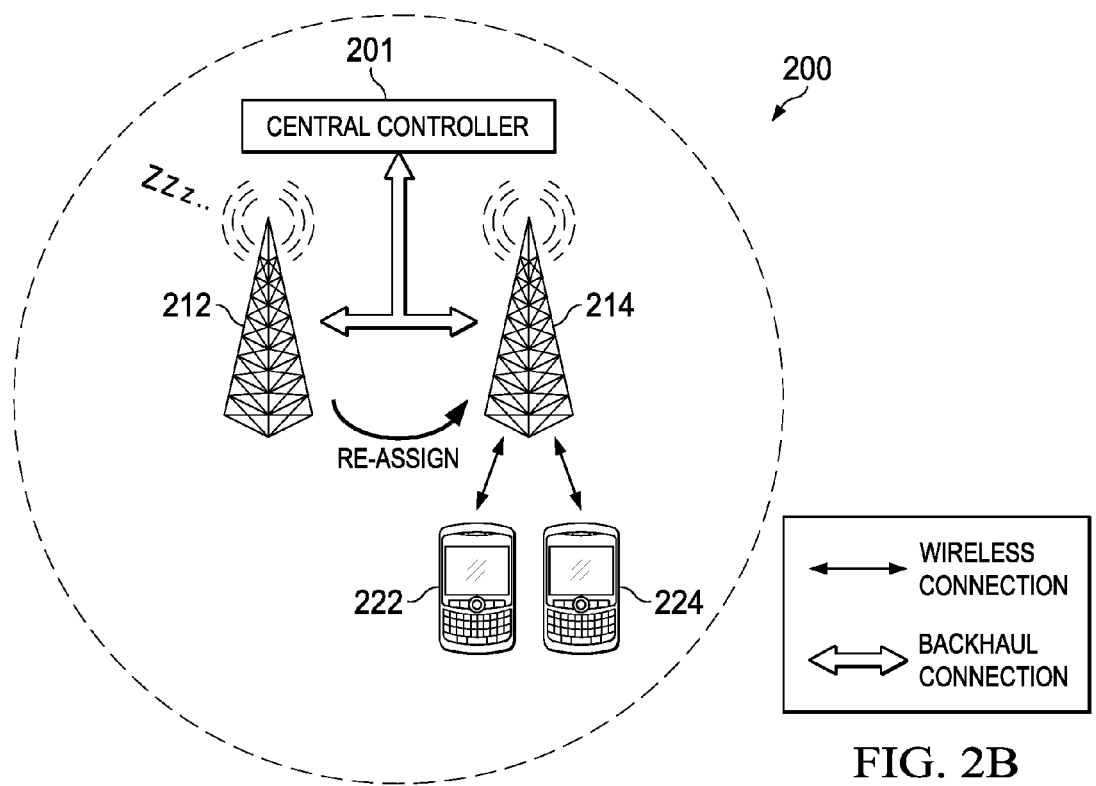

Aspects of this disclosure modify scheduling assignments to improve a TP muting utility. FIGS. 2A-2B illustrate a network architecture 200 configured to modify scheduling assignments to improve a TP muting utility. In an embodiment, the network architecture 200 may comprise a cloud radio access network (CRAN). As shown, the network architecture 200 comprises a central controller 201, a plurality of access points 212, 214, and a plurality of UEs 222, 224. In some embodiments, the central controller 201 is a macro base station, and the access points 212, 214 are low-power nodes, e.g., femtocells, etc. In other embodiments, the central controller 201 is a centralized scheduler for the access points 212, 214, which may be macro-cells, low-power nodes, or any other type of wireless access point. FIG. 2A illustrates an initial scheduling assignment for network architecture, in which the UE 222 is served by the access point 212, and the UE 224 is served by the access point 214. As shown in FIG. 2B, the central controller 201 may re-assign the UE 222 to the access point 214, thereby allowing the access point 212 to be transitioned into a sleep mode to improve a utility parameter (e.g., overall scheduling utility, TP muting utility, etc.) of the network architecture 200.

Aspects of this disclosure provide embodiment network architectures for achieving dynamic traffic offloading and TP muting in a virtual radio access network (V-RAN). In some embodiments, a central controller may optimize downlink transmissions over a group of transmit points. User-specific control flows can be offloaded similar to data flows. Flow utility may be calculated based on UL measurements from either the target UE (TUE) or its helping UE (HUE). For a given wideband muting hypothesis, dynamic coordinated multi-point (CoMP) scheduling is performed. Muting hypotheses are compared using a novel energy-aware utility that comprises data/control traffic utilities and muting incentive/turning-on penalties. The muting incentive/turning-on penalties may be expressed as a function of TP power consumption models, an Energy Saving Coefficient (e.g., which may set and/or dynamically manipulated by the network operator), and Soft Loading Ratios based on predicted traffic loads and/or soft UE associations at each TP.

Figure 3:
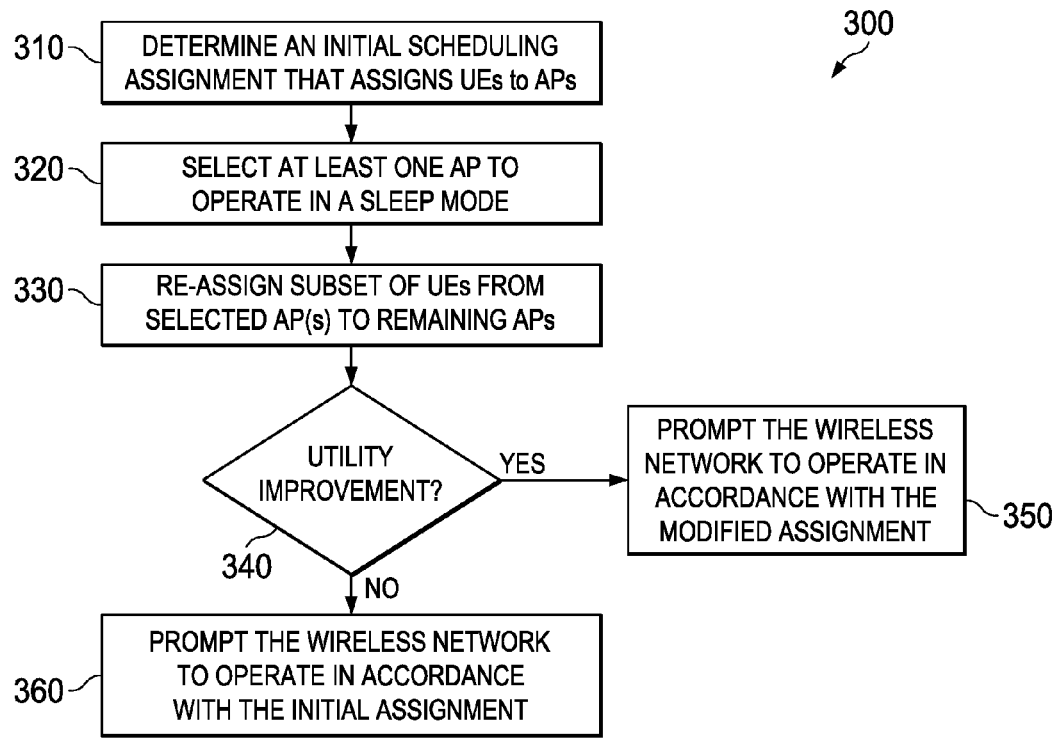
FIG. 3 a flowchart of an embodiment method for computing scheduling assignments.

Aspects of this disclosure provide embodiment methods for low-complexity scheduling assignment computation with access-point muting. FIG. 3 illustrates an embodiment method 300 for modifying a scheduling assignment to achieve TP muting, as might be performed by a central controller, e.g., a macro-base station, central scheduler, etc. As shown, the method 300 begins at step 310, where the central controller determines an initial scheduling assignment that assigns UEs to a plurality of access points (APs) during a time interval. The initial scheduling assignment may have been computed based on performance criteria (e.g., throughput etc.), or some other criteria. Next, the method 300 proceeds to steps 320-330, where the central controller modifies the initial scheduling assignment to achieve through TP-muting. More specifically, the method selects at least one AP to operate in a sleep mode at step 320, and then re-assigns subsets of UEs from the selected AP(s) to remaining APs at step 330. This sub-set of UEs were assigned to the selected AP(s) by the initial scheduling assignment, and are assigned to the remaining APs by the modified scheduling assignment. As a result, the selected APs can be muted. In some embodiments, other UEs assigned to active APs (e.g., APs not muted by the modified scheduling assignment) are also re-assigned during step 330 to improve the utility (or performance) of the modified scheduling assignment. Next, the method 300 proceeds to step 340, where the central controller determines whether modifying the initial scheduling assignment improves a scheduling utility. This may include computing a utility function in accordance with both the initial scheduling assignment and the modified scheduling assignment, and then comparing the resulting utility values. The utility function may include various different factors, such as total power utilization, total performance, etc.

If the modified scheduling assignment provides a utility improvement over the initial scheduling assignment, then the method 300 proceeds to step 350, where the scheduling device prompts the wireless network to operate in accordance with the modified assignment. Otherwise, if there was no improvement in utility (or the improvement was less than a threshold), then the method 300 proceeds to step 360, where the scheduling device prompts the wireless network to operate in accordance with the initial scheduling assignment.

Figure 4:
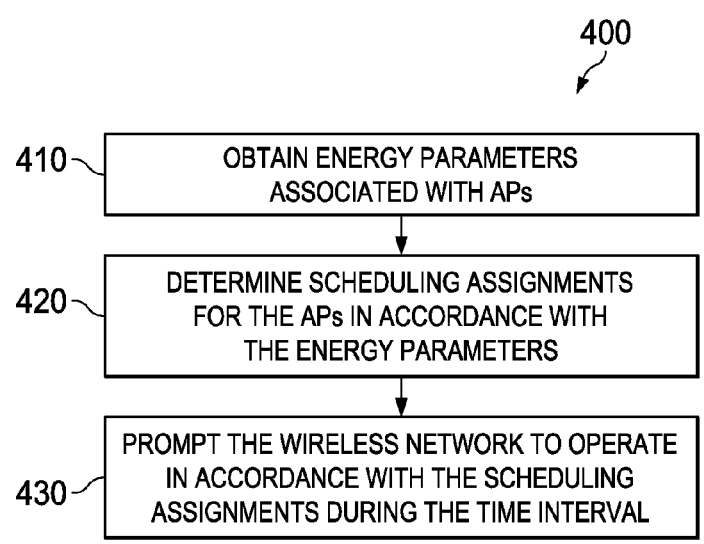
FIG. 4 a flowchart of another embodiment method for computing scheduling assignments.

In some networks, access points may operate using different energy sources during different periods. As one example, an access point may operate off solar power during day-light hours, while operating off grid power during night-time hours. In such cases, it may be helpful to consider the energy parameters associated with the individual APs when selecting APs to mute during a given period. FIG. 4 illustrates an embodiment method 400 for computing scheduling assignments in accordance with energy parameters associated with candidate APs, as might be performed by a scheduling device. As shown, the method 400 begins at step 410, where the scheduling device obtains energy parameters associated with from access points in a wireless network. The energy parameters may indicate an energy type being used by the AP, as well as other information, such as a usage rate, price, carbon impact, etc. In one embodiment, the scheduling device receives an indication from the access point indicating the energy type being used (e.g., solar, electricity, etc.) and/or the rate of consumption, e.g., access point N is consuming M kilowatt-hours (kWh), etc. Thereafter, the scheduling device may access a database to obtain additional energy parameters associated with the energy type, e.g., the price-per-energy-unit in the access point's local area, etc. In yet other embodiments, the scheduling device infers the energy type and/or consumption rate from a history (or known operation) of the access point, e.g., access-point operates off solar power from dawn until dusk, and grid power from dusk until dawn.

After the energy parameters are obtained, the method 400 proceeds to step 420, where the scheduling device determines scheduling assignments in accordance with the energy parameters. In this example, the scheduling device may select which access points to mute based on, for example, the energy cost and/or environmental impact. For example, the scheduling device may be more apt to mute an access point operating off grid power, than an access point operating off solar power. Next, the method 400 proceeds to step 430, where the scheduling device prompts the wireless network to operate in accordance with the scheduling assignments.

Figure 5:
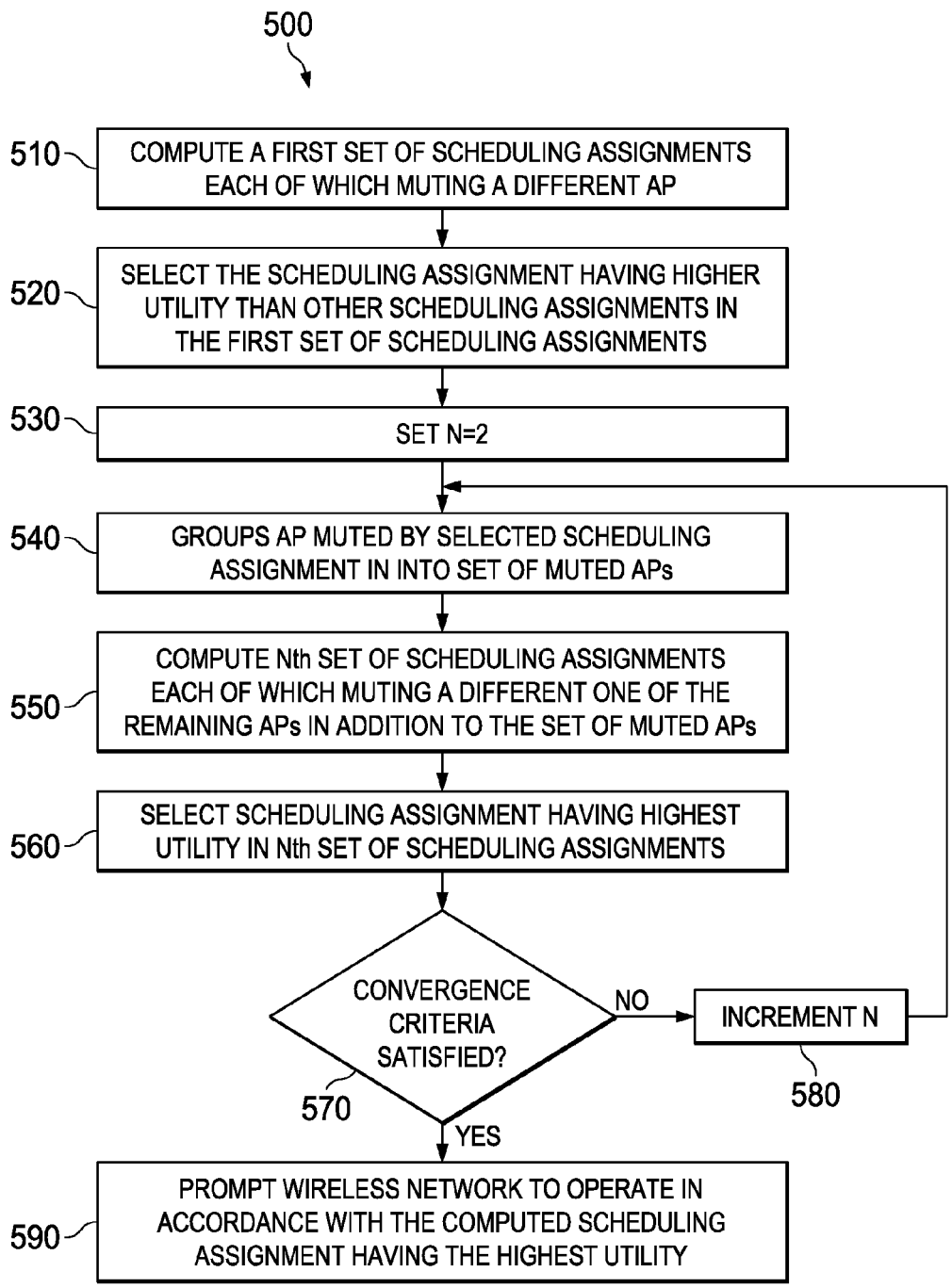
FIG. 5 a flowchart of yet another embodiment method for computing scheduling assignments.

Scheduling assignments can be computed using an exhaustive search that considers the utility of all possible scheduling assignments, e.g., all possible TP muting combinations. However, such techniques may have high degrees of computational complexity, and consequently may be ill-suited for large networks. Aspects of this disclosure provide low-complexity alternatives that use a greedy search algorithm to compute the scheduling assignments. FIG. 5 illustrates an embodiment method 500 for low-complexity scheduling assignment computation with access-point muting, as might be performed by a scheduling device. As shown, the method 500 begins at step 510, where the scheduling device computes a first set of scheduling assignments. Each scheduling assignment in the first set of scheduling assignments mutes a different one of a plurality of APs. Next, the method 500 proceeds to step 520, where the scheduling device selects the scheduling assignment having a higher utility than other scheduling assignments in the first set of scheduling assignments. In some embodiments, this may be a two-part step, where the utilities are computed based on a utility function during a first step, after which the computed utilities are compared to identify the highest utility during a second step.

Thereafter, the method 500 proceeds to step 530, where the scheduling device sets the iteration counter (N) to two. Next, the method 500 proceeds to step 540, where the scheduling device groups the AP muted by the selected scheduling assignment into set of muted APs. Subsequently, the method 500 proceeds to step 550, where the scheduling device computes the Nth set of scheduling assignments. Each scheduling assignment in the Nth set of scheduling assignments mutes a different one of the remaining APs (e.g., APs excluded from set of muted APs) in addition to the set of muted APs.

Next, the method 500 proceeds to step 560, where the scheduling device selects the scheduling assignment that has the highest utility in the Nth set of scheduling assignments.

Thereafter, the method 500 proceeds to step 560, where the scheduling device determines whether a convergence criteria has been satisfied. In one embodiment, the convergence criteria is satisfied when a difference between the utilities of the scheduling assignments selected during both the current iteration and the preceding iteration fails to exceed a threshold. In another embodiment, the convergence criteria is satisfied when the utility of the scheduling assignment selected during the preceding iteration exceeds that the utility of the scheduling assignment selected during the current iteration. In yet another embodiment, the convergence criteria is satisfied after a pre-defined number of iterations, e.g., when N>a threshold.

If the convergence criteria is not satisfied, then the iteration counter (N) is incremented in step 580, after which point the method 500 reverts back to step 540. Conversely, if the convergence criteria is deemed to have been satisfied in step 570, then the method 500 proceeds to step 590, where the scheduling device prompts the wireless network to operate in accordance with the computed scheduling assignment having the highest utility. This may typically be the scheduling assignment selected during the final iteration, or the scheduling assignment selected during the immediately preceding iteration in the event that there was a reduction in utility during the final iteration.

Conventional techniques for improving energy-efficiency in orthogonal frequency division multiple access (OFDMA) single cell networks do not provision resource for the purpose of offloading traffic. Rather, conventional techniques improve energy efficiency by considering a linear base station (BS) power consumption model. The models used by the prior art do not account for sleep capability, and do not enforce or provide wideband muting. Examples of conventional techniques for increasing energy efficiency in base stations are described by IEEE publication entitled 'Energy-Efficient Resource Allocation in OFDMA Networks,' (IEEE Transactions on Communications, vol. 60, no. 12, December 2012), IEEE publication "Downlink Transmission Optimization Framework," (Vehicular Technology Conference (VTC Fall), 2012 IEEE, vol., no., pp. 1, 5, 3-6 September 2012), and IEEE publication "Traffic-aware base station doze in cooperative multi-cell systems," (2013 IEEE China Summit & International Conference vol. 394, no. 398, pp. 6-10 July 2013), each of which are incorporated herein by reference as if reproduced in their entireties.

In embodiments, a virtualized RAN may derive energy savings by performing dynamic wideband muting jointly with dynamic multi-point scheduling. Dynamic offloading may be a byproduct of embodiment techniques. Embodiments may offload both data and user-specific control traffic. Embodiments provide low-complexity optimization techniques that use energy-aware utilities with steep ascents to perform joint optimization. Aspects of this disclosure provide novel, energy-aware utility formulation techniques. Aspects may allow operators to flexibly manage energy savings and performance tradeoffs. Aspects of this disclosure provide support for UE cooperation through device-to-device (D2D) communications.

In embodiments, a controller may be configured to maximize an energy-aware utility function. The following is an example of an energy aware utility function: $U = \Sigma_{k,n} U_{k,n} + \Sigma_{k,n} C_{k,n} + c\Sigma f(u_i, \sigma_i) P_i$, where $\Sigma f(u_i, \sigma_i) P_i$ is the muting incentive (or activation penalty), $u_i$ is the data loading ratio, $\sigma_i$ is the control loading ratio, c is the energy saving coefficient, $P_i$ is the normalized transmit point power savings, $U_{k,n}$ is the data utility of $UE_k$ on resource$_n$, and $C_{k,n}$ is the control utility of $UE_k$ on resource$_n$.

In some embodiments, the energy-aware utility function models power consumptions of different TP types in heterogeneous networks. A muting incentive component of the energy-aware utility function may include a parameter ($P_i$) that corresponds to the normalized saved power for $TP_i$ with respect to the macro BS's maximum power consumption.

The energy-aware utility function may employ 'Soft Loading Ratios' based on predicted traffic loads and/or soft UE associations at each TP. A TP's soft loading ratio could be the probability that it is perceived the best serving TP by the population of active flows. A TP's soft loading ratio could also be the normalized soft Flow-TP associations considering load balancing and weights of active flows. This may correspond to a dynamic version of a 'soft UE-TP association' calculation. The energy-aware utility function may feature a single control parameter (e.g., 'Energy Saving Coefficient') for tuning the energy savings-performance tradeoff. The energy-aware utility function may be scalable for different TP group sizes and different UE pool sizes, and may be applicable to different traffic types, e.g., Best Effort, GBR, target GBR rate, etc.

In embodiments, the energy-aware utility function may perform TP muting with close flow utilities. For example, the utility function may offload traffic and control signaling to achieve higher power savings from TPs with relatively low instantaneous loads.

In some embodiments, the energy saving coefficient may be set to a value between (for instance) 2.5 and 3 to achieve increased system capacity for CBR traffic and improved coverage and energy efficiency for best-effort traffic. This may be scalable to different TP group sizes, different UE pool sizes, different topologies, and different target CBR rates.

Figure 6:
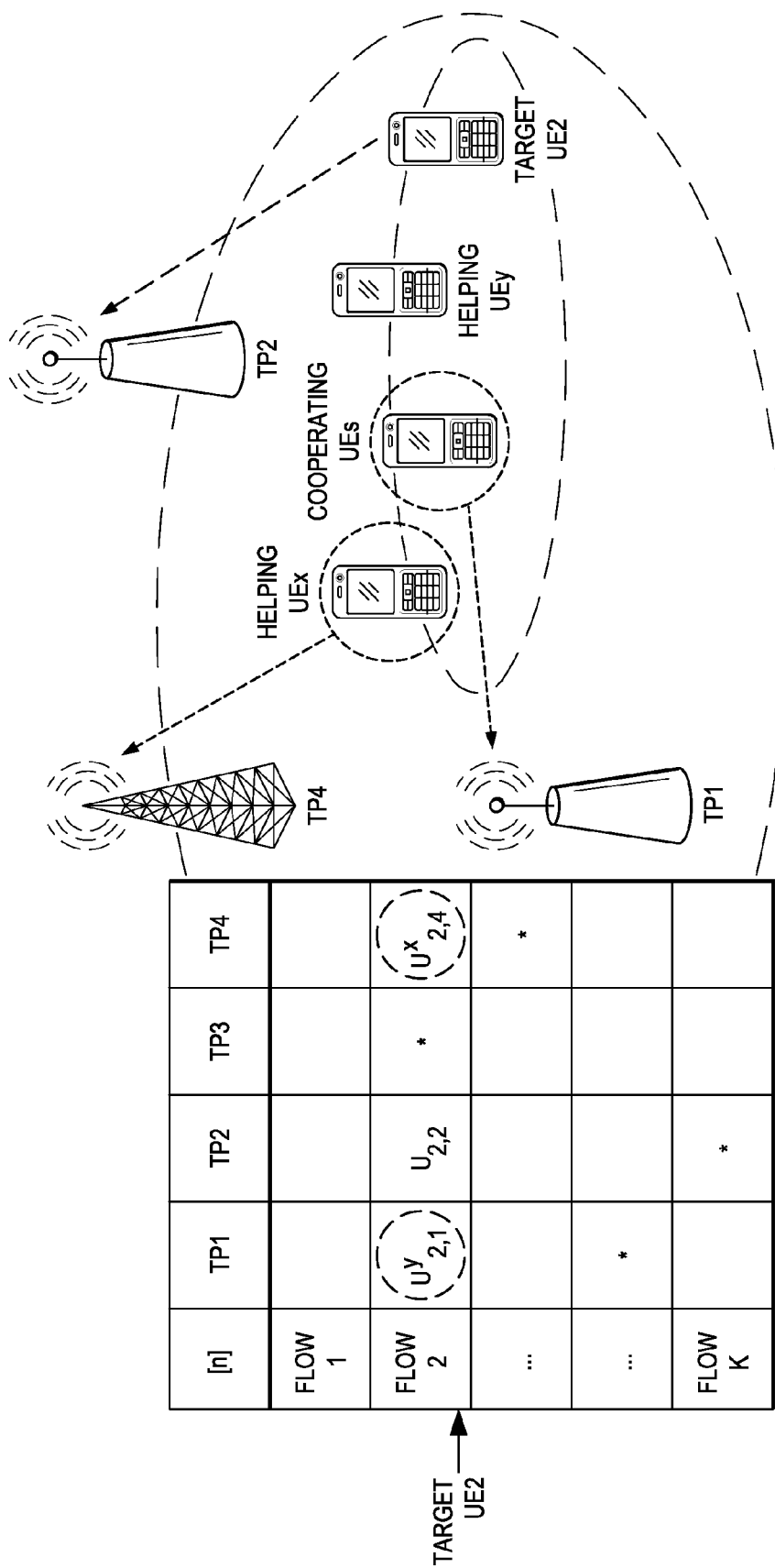
FIG. 6 illustrates a diagram of another embodiment network architecture.

FIG. 6 illustrates an embodiment virtual radio access network (V-RAN) architecture for achieving dynamic traffic offloading and TP muting using device to device (D2D) communications. As shown, measured UL signals can originate from the selected helping UE(s) of the target UE when UE cooperation is enabled. Flow utilities may be calculated based on, for instance, the CQI of the best helping UE at the candidate TP. In such cases, wideband muting, offloading and multi-point scheduling can be used to exploit the D2D capabilities. Improved flow utilities may create more muting/offloading opportunities. Aspects of this disclosure may exploit wake up mechanisms discussed in U.S. Provisional 18/631,104 filed on Mar. 31, 2014, which is incorporated by reference herein as if reproduced in its entirety. In some embodiments, UL-muted TPs are periodically woken-up to maintain UL based measurements, such as UE/TP association map. Wake-up periods can be configured by the network. Event-triggered based wake-ups can also be employed when a UE reports a significant change in DL background interference power.

Figure 7A:
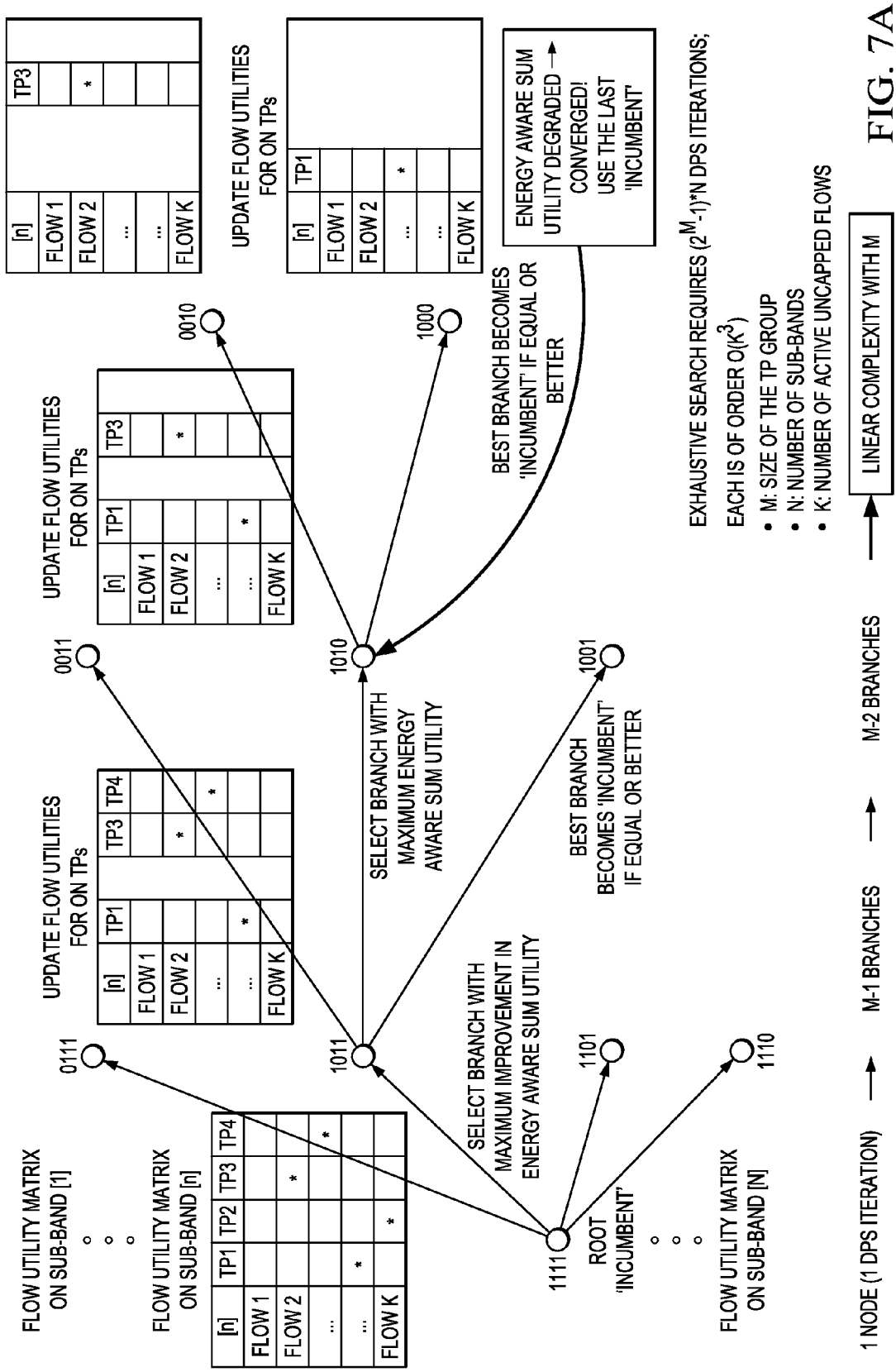
FIGS. 7A-7B illustrate diagrams of a low-complexity optimization technique for dynamic point selection (DPS) scheduling.
Figure 7B:
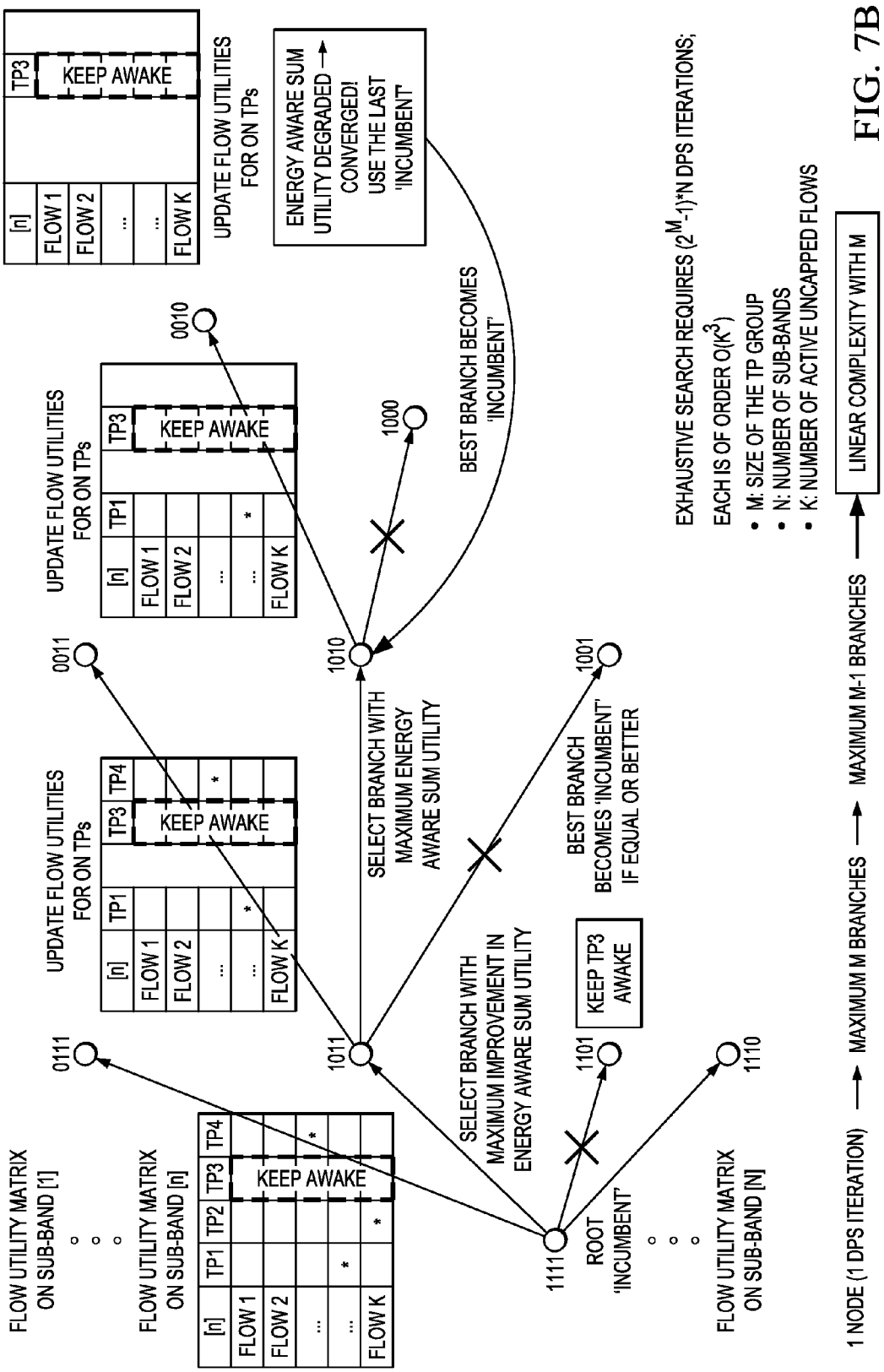

Aspects of this disclosure may provide low-complexity optimization techniques. With large cluster sizes, an exhaustive search over all possible muting hypotheses may be relatively complex. An embodiment low-complexity optimization technique based on the steepest ascent algorithm is provided. The algorithm may begin when all TPs are activated, and may span all branches of a 'bud node'. For each branch, one TP from a set of activated TPs is evaluated at a time to determine which TPs should be muted. Evaluation may comprise a virtualized muting of the TP to explore one dimension of the feasible region at a time. With the interference from the muted TP suppressed, flow utilities can be updated for activated TPs, and masked for the muted TP. Scheduling results re computed for each scenario, and an energy-aware sum utility is computed for each scheduling result. Embodiment algorithms may promote the virtual scenario having the greatest sum utility to be the new 'incumbent solution'. The algorithm continues branching from the new incumbent for the remaining un-muted TPs and stops when muting degrades the energy-aware sum utility (or when the incremental improvement fails to exceed a threshold). The last 'incumbent solution' along with its resource scheduling result are then executed. FIGS. 7A-7B illustrate diagrams of a low-complexity optimization technique for dynamic point selection (DPS) scheduling. More specifically, the first iteration of DPS scheduling is demonstrated by FIG. 7A, while the final iteration of DPS scheduling is demonstrated by FIG. 7B.

There is a constantly increasing interest in developing green next generation wireless networks with minimal carbon foot print. In fact, greening wireless networks is a global initiative with huge investments and a promising market. The initiative also aims at reducing the high operational expenditure (OPEX) mobile network operators incur in terms of electricity costs while maintaining network's performance. Studies conducted on estimating the power consumption of various components of the wireless networks revealed that base stations (BSs), in general, consume around 80% of the energy required to operate a cellular network. Within such a dominant share, the RF power amplifier's consumption amounts to 55-60% in case of Macro BSs and less than 30% in case of Micro BSs and low power nodes. Studies also revealed that, in long time scales, only a small fraction of resources/cells in existing networks are idle. Whereas in short time scales, vast majority of resources/cells are idle. At such low loads, the energy efficiency (EE) of contemporary systems is poor. This is due to the power overhead that BSs consume regardless of their non-zero load. The situation becomes even worse with the envisaged dense deployment of small cells in the next generation networks in attempt to provide the users with virtually seamless radio access service anywhere, anytime. Beside the envisioned Cloud RAN (CRAN) aspects such as strong backhaul, computational power, and multi-point coordination, both data and UE-specific control signals can be transmitted from any optimized set of TPs leading to a completely virtualized RAN (VRAN) from the UE's perspective. In addition, network-assisted UE cooperation leads to UE virtualization from network's perspective. VRAN is thus more capable than traditional RANs to adopt an energy/cost-efficient 'always-available' rather than 'always-on' design approach.

Aspects of this disclosure provide an energy/cost-aware dynamic wideband muting and traffic offloading scheme utilizing the cloud aspects of VRAN. The scheme favors muting hypothesis with greater savings from relatively less loaded TPs. Aspects of this disclosure exploite the small cell deployment and multi-point coordination such that loads are opportunistically offloaded to adjacent TPs to improve their energy/cost efficiency. This is achieved by low-complexity joint wideband muting and multi-point scheduling techniques that optimize an embodiment energy/cost-aware utility. The embodiment utility formulation accounts for the power consumption models of different TPs, the current economical or environmental cost per unit energy, and the TP's predicted 'Soft Loading Ratios' (SLRs). An 'Energy Saving Coefficient' (ESC) is introduced to allow the operator to tune the savings-performance tradeoff in individual network regions over time regardless of TP group size, UE pool size and UE distribution. Different system level simulation scenarios are considered to demonstrate the ability of our proposed scheme to exploit the offloading/muting opportunities. Results show significant energy efficiency and system capacity gains.

An embodiment system model can be based on longer-term traffic variations. A network management/traffic engineering unit may select a subset of TPs to be completely switched off, and may divide the rest of the network into TP groups for dynamic optimization by the central controllers (CCs). Within a heterogeneous group of TPs, M, the CC dynamically optimize the DL wideband muting jointly with the multi-point transmission, e.g., scheduling, beamforming, and/or per sub-band power control for the non-muted TPs. Strong backhaul connections may exist. Over the core network, the management unit updates the CC with the desired operating point given, for instance, the geographical region and the time of day. In addition, type, model, and vendor specific power consumption parameters may be provided to the CC upon TP's registration with the VRAN. Through periodic uplink measurements from the set of UEs with packets to receive, i.e., active UEs, $K_a$, the potential downlink co-channel interference is estimated.

A TP can be powered by hybrid energy sources e.g., the Grid, Diesel, solar, or wind power. The CC is aware of the type of energy TP, consumes through some signaling from the TP's power supply/uninterrupted power supply. The associated current economical and/or environmental cost values per unit energy, $\delta_i(t) \forall i \in M$, are provided to the CC over the core network if cost-savings are desired as compared to pure energy savings. Information is otherwise provided through the connection to the Smart Grid. Based on experimental measurements, the power consumption model of a TP can be approximated to a linear model, and can be extended to capture multi-point coordination as follows: $P_i(t) = \alpha_i P_{i,tx}(t) + P_{i,c}(t) + P_{i,p}(t)$, (1), where $P_i(t)$ denotes the total power consumption of $TP_i$ during the t-th transmission interval of length T seconds, while $P_{i,p}(t)$ is the processing and backhauling power as function of the TP group size and the backhaul traffic, respectively. The slope parameter $\alpha_i$ scales the total RF transmit power, $P_{i,tx}(t)$, to represent the load-dependent behavior of the power amplifier. For a state-of-art TP, the circuitry power, $P_{i,c}(t)$, switches between two levels (high and low) based on the RF load as follows:

$$P_{i,c}(t) = \begin{cases} P_{i,h}, & P_{i,tx}^{max} \geq P_{i,tx}(t) > 0, \\ P_{i,l}, & P_{i,tx}(t) = 0. \end{cases} \quad (2)$$

Whereas for a traditional TP, e.g., with 'No Sleep' hardware, the circuitry power consumption may stay at the high level, e.g., $P_{i,c}(t) = P_{i,h}$, $P_{i,tx}^{max} \geq P_{i,tx}(t) \geq 0$. Assuming an almost constant backhaul traffic due to CoMP while using a fixed size TP group, when traffic is completely offloaded from a state-of-art TP, or temporarily, there are no active flows for it to serve, its total power consumption is reduced to a constant minimum, i.e., $P_i(t) = P_{i,sleep} = P_{i,l} + P_{i,cnst}$. However, for a traditional TPs, the total power consumed $P_i(t) = P_{i,0} = P_{i,h} + P_{i,cnst}$. The network's long-term EE is a key performance indicator for pure energy savings and defined as the ratio between total network throughput over the time window $\Delta$ seconds and the total energy consumed by all the TPs in the network within that time window as follow:

$$EE = \frac{\Sigma_{t,k} r_k(t) \cdot T}{\Sigma_{t,i} P_i(t) \cdot T} \text{ [bits/Joule]}, \quad (3)$$

where $r_k$ is the throughput of user k during the t-th interval. When cost savings are desired, the long-term cost efficiency can be used instead and is defined as follows:

$$CE = \frac{\Sigma_{t,k} r_k(t) \cdot T}{\Sigma_{t,i} P_i(t) \cdot T \cdot \delta_i(t)} \text{[bits/\$] or [bits/KgCO}_2\text{]}, \quad (4)$$

where the sum throughput is over the set of all users admitted to the network and the sum power is over all the TPs. Due to the space limitation, however, we limit the results in this paper to pure energy efficiency so that the impact of different components of the energy-aware formulation can be studied.

Aspects of this disclosure provide a Novel Energy/Cost-Aware Utility Formulation. At any allocation instant, the CC could be ideally maximizing the following energy/cost-aware utility function over all possible wideband muting hypotheses, $\{\pi_l\}$, $0 \le l \le L = 2^{|M|} - 1$, $U_{EA}(t,\pi_l) = \Sigma_{k \in K_a, n \in N} U_{k,n} (S_{MP}(t,\pi_l)) + c\Sigma_{i \in M} f(\mu_i(t, K_a)) S_i(P_{i,tx}(t), \delta_i)$. (5) Here, $S_{MP}(t, \pi_l)$ is the multi-point scheduling function that jointly assigns the UEs to serving beams on each sub-band n∈N, and calculates the transmit precoders and the power masks for the non-muted TPs of hypothesis $\pi_l$ to maximize the sum flow utilities per sub-band. The QoE-aware flow utility for scheduling buffered video on demand and best effort traffic in could be used, for instance. The vector of wideband RF transmit powers, $P_{tx}(t)$, is thus calculated accordingly for the muting hypothesis. The second term acts as a muting incentive or a turning on penalty and is enabled by setting the ESC, c>0. The greater the ESC, the more aggressive the scheme is in TP muting and energy/cost conservation while maximizing the energy-aware utility $U_{EA}$. Whereas f(.) is a positive normalized decreasing function of the SLR $\mu_i(t,K_a)$ which resembles the instantaneous probability that $TP_i$ is perceived a potential serving TP by the dynamically varying population of active flows $K_a$ based on geometry and the ratios of flow rate requirements. Note that considering the time scale of the dynamic optimization, the time notation has been dropped for the longer-term parameters, ESC, and the current cost per unit energy, $\delta_i$. The savings function $0 \le S_i(.,.) \le 1$ calculates the normalized energy/cost savings w.r.t a maximum reference value, i.e., the product of the maximum achievable Macro BS power savings, $P_{Macro}^{max} = \max_{i \in Macro}\{P_i^{max} - P_{i,sleep}\}$, and the maximum cost per unit energy, $\delta_{max} = \max_{i \in M}\{\delta_i\}$. Therefore, $S_i(P_{i,tx}(t), \delta_i)$ can be expressed as follows for cost savings-oriented optimization:

$$S_i(P_{i,tx}(t), \delta_i) = \frac{(P_i^{max} - P_i(t))\delta_i}{P_{Macro}^{max} \cdot \delta_{max}} \forall i \in M, \quad (6)$$

whereas for pure energy savings, $\delta_i = 1$ $\forall i \in M$. As such, each TP in the cluster would have a dynamic wideband muting weight that is proportional to its likelihood of offloading its traffic and its energy/cost savings. The normalization allows the operator to set the operating range of the ESC based on the nature of flow utilities employed regardless of TP group size, UE pool size and UE distribution.

Aspects of this disclosure provide a Low-Complexity Optimization Algorithm. With large TP group sizes, e.g., dense deployment of small cells, an exhaustive search over all possible wideband muting hypotheses becomes prohibitively complex. Therefore, a low-complexity algorithm based on steepest ascent approach is devised.

Figure 8:
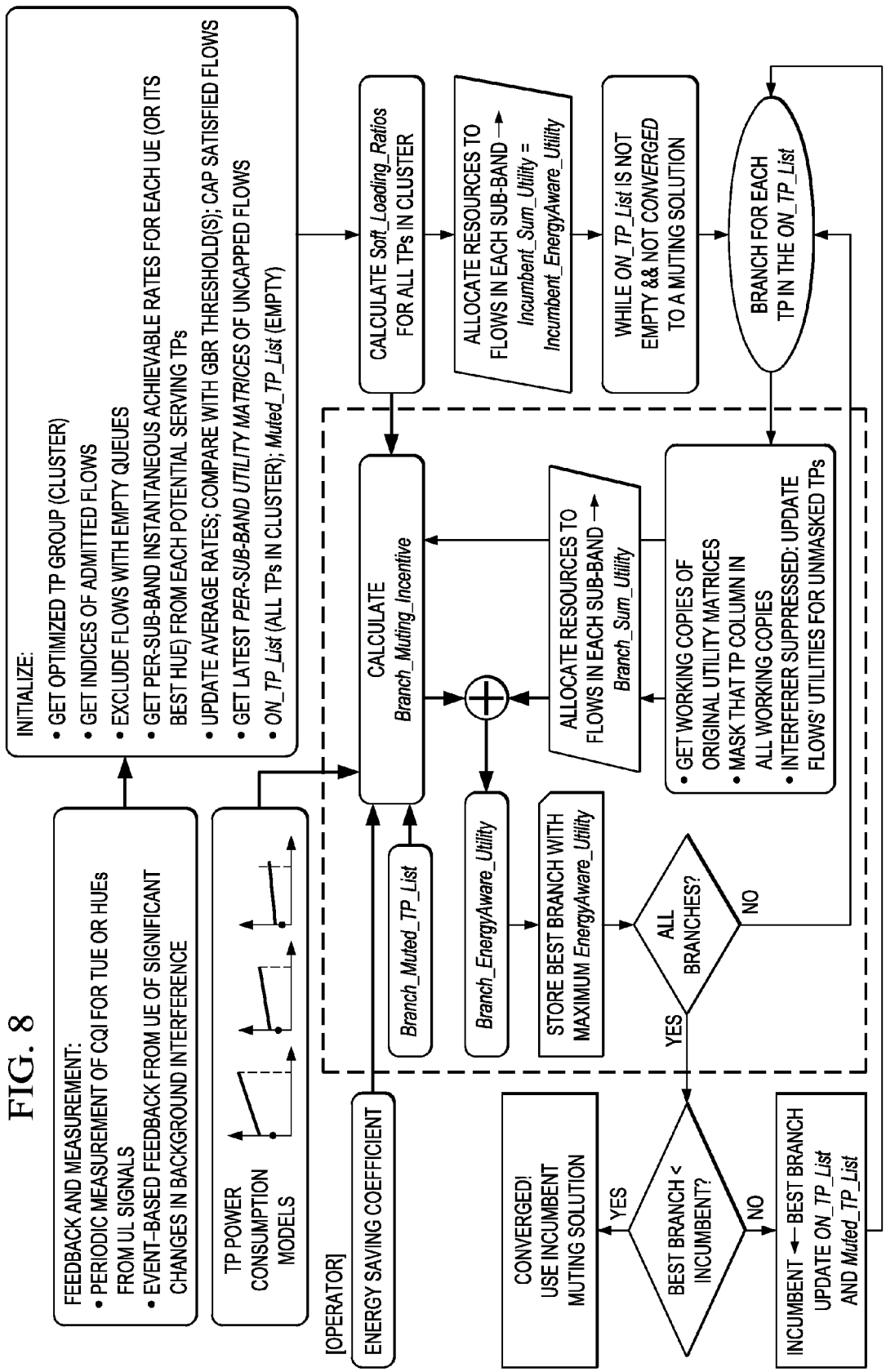
FIG. 8 illustrates a flowchart of an embodiment method for achieving low-complexity TP muting and scheduling.

FIG. 8 illustrates a flowchart of an embodiment method for achieving low-complexity TP muting/scheduling. The embodiment method starts from the 'all-on' initial solution and spans all the branches of this 'bud node'. For each branch, one TP from all possible |M|TPs (grouped TPs excluding ones that are kept awake for transmitting broadcast and synchronization signals) is examined at a time for wideband muting. The proposed energy-aware utility function is computed within the dashed module encompassing the sum flow utilities of CoMP scheduling and the muting incentive term as in (5) and (6). The algorithm promotes the hypothesis (branch) with the greatest sum utility to be the new 'incumbent solution' which is the new bud node for further branching after eliminating the muted TP from the list. Through the outer loop, the algorithm continues with the remaining un-muted TPs and terminates when convergence is attained, i.e., no further improvement in the energy-aware sum utility. The CoMP scheduling results and the wideband muting hypothesis of the latest incumbent solution are executed. The algorithm thus requires at most $(|M|^2 + |M|)/2 - 1$ outer iterations on CoMP scheduling and muting incentive calculations in case convergence has not been attained at an earlier stage. In an embodiment, a network controller operates on a group of transmit points, which may be a cluster or a candidate set specified by the network layer. A Joint Wideband Muting and Dynamic Point Selection algorithm may be employed by the network controller to analyze the data portion of traffic. BSs with no scheduled UEs will be transitioned to a 'sleep mode,' and their power consumption may be reduced. Flow utilities are peak flow based, and parameters used for weight calculation are not updated when a CBR flow is satisfied. In embodiments, the algorithm could maximize the following utility function: $U = \Sigma_{k,n} U_{k,n} + c\Sigma_{i \in Muted}(1 - u_i)P_i$, where $u_i$ is the data loading ratio, c is the energy saving coefficient, and $P_i$ is the normalized transmit point power consumption.

Figure 9:
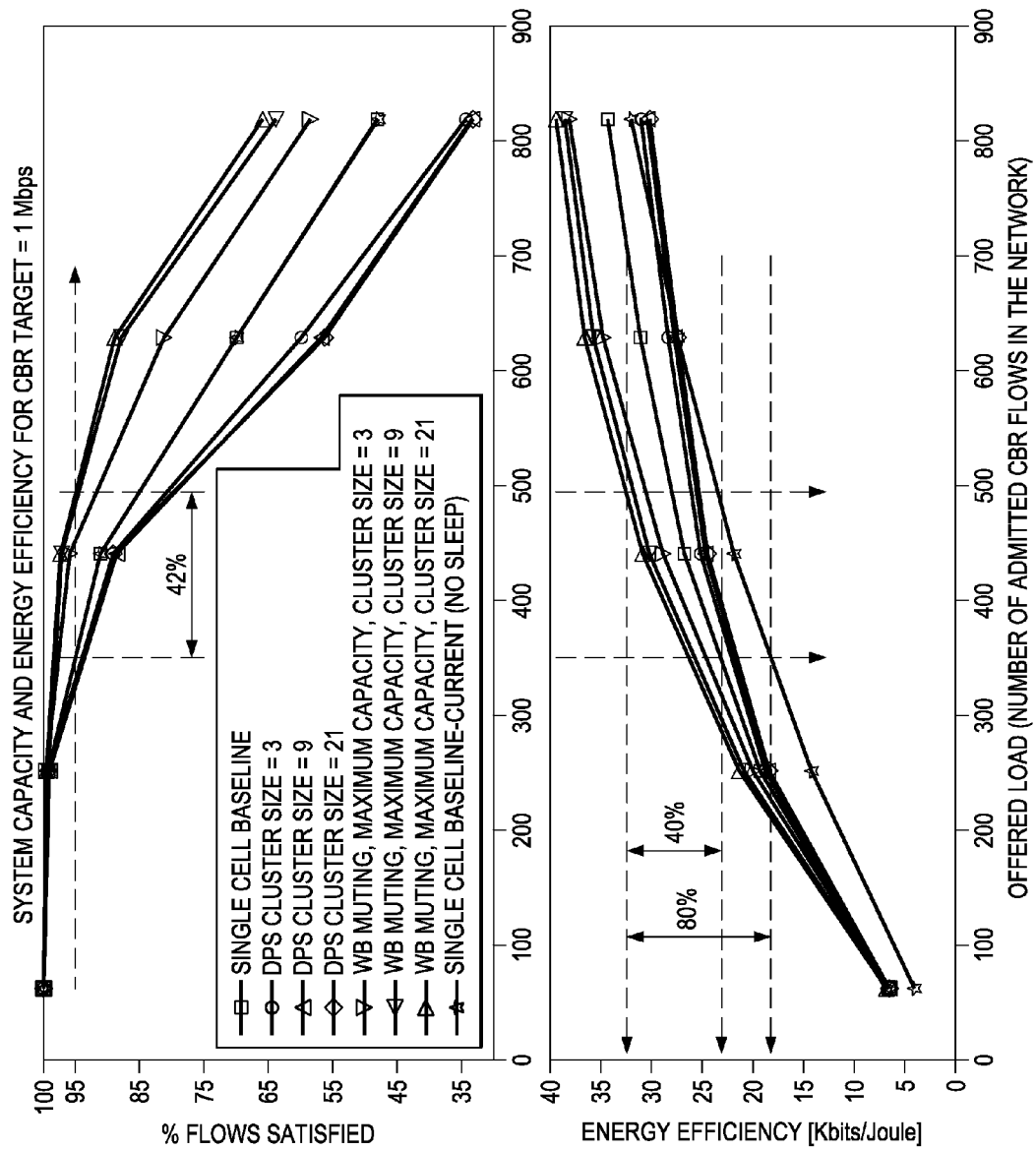
FIG. 9 illustrates a graph of a system capacity analysis.
Figure 10:
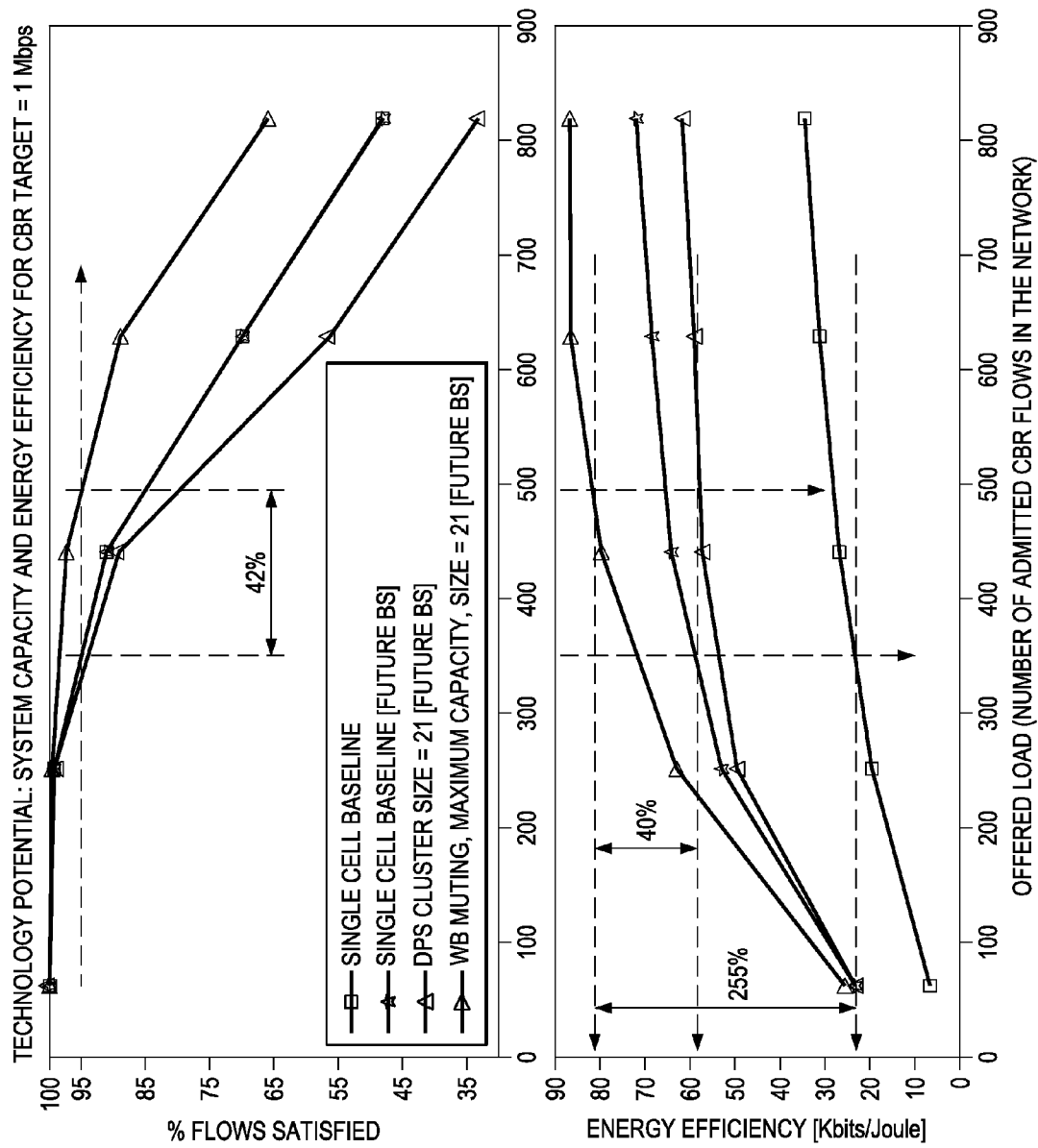
FIG. 10 illustrates a graph of another system capacity analysis.

FIG. 9 illustrates graphs depicting a system capacity analysis for target constant bit rate of one megabyte per second (Mbps) for state of the art base stations. FIG. 10 illustrates graphs depicting a system capacity analysis for target constant bit rate of one megabyte per second (Mbps) for future base stations, e.g., base stations having greater capabilities than state of the art base stations.

Aspects of this disclosure provide a virtualized RAN architecture capable of achieving network energy savings through dynamic wideband muting with dynamic multi-point scheduling. Dynamic offloading may be a byproduct of embodiment techniques disclosed herein. Aspects may offload both data and user-specific control traffic. Low-complexity optimization techniques may provide energy-aware utility by using a steepest ascent algorithm.

Aspects provide embodiment energy-aware utility formulations. Aspects provide flexibility for an operator to find a balance between energy savings and performance. Aspects utilize UE cooperation through D2D to offload traffic and provide energy savings.

Proposed schemes can operate in dynamic manners. Low-complexity optimization techniques provided herein may avoid huge computational complexity that occurs when conventional techniques are applied to networks having large cluster sizes, large user pools, and/or advanced CoMP scheduling.

Simulation results with DPS show that avoiding the muting incentive/turning-on penalty allows embodiment networks to outperform non-muting DPS networks, while still providing significant capacity and energy efficiency gains.

Figure 11:
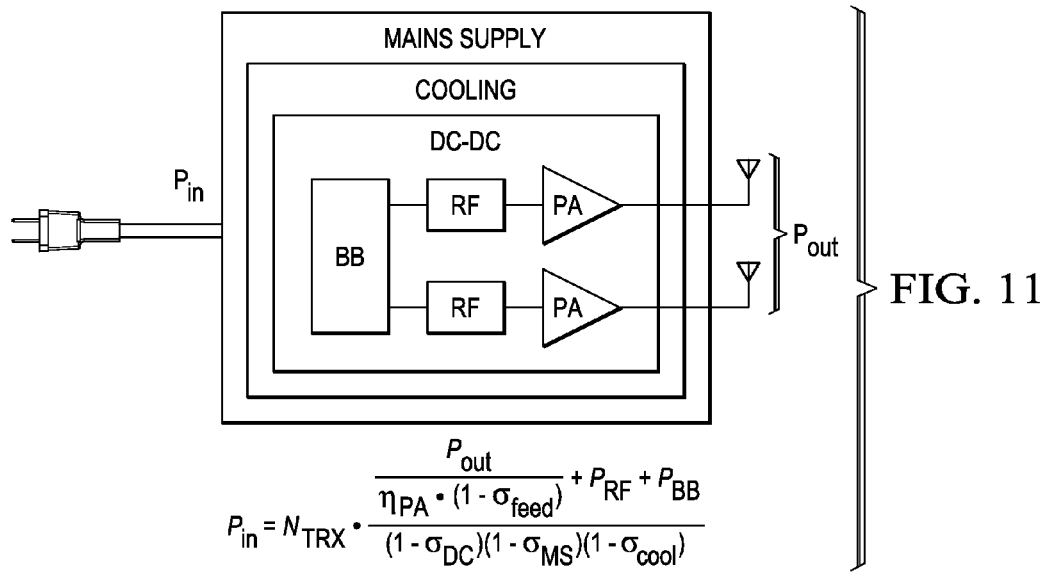
FIG. 11 illustrates a diagram of a power consumption model.
Figure 12:
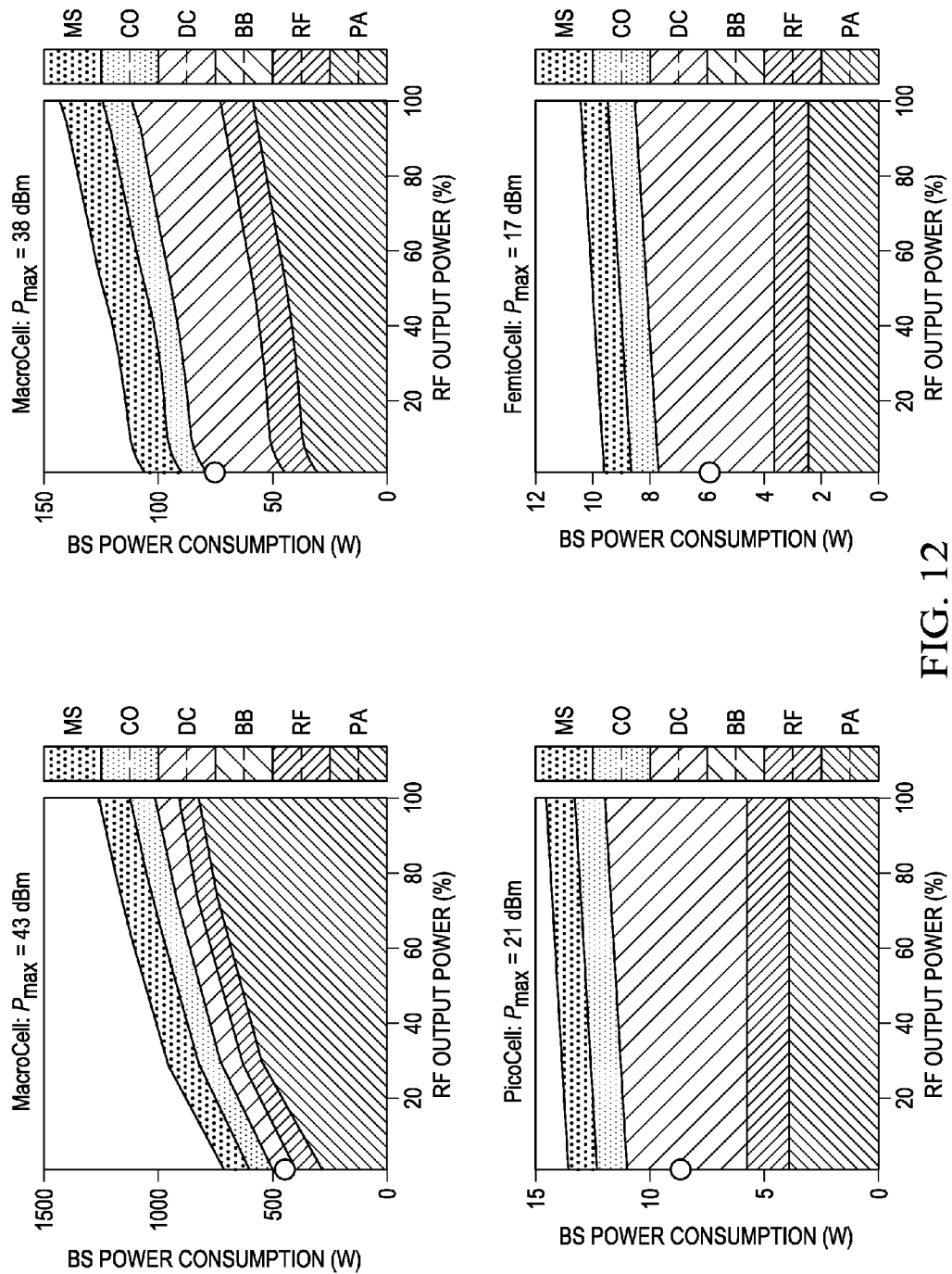
FIG. 12 illustrates graphs of a power consumption model.

Aspects of this disclosure may offload both data and control traffic. Aspects of this disclosure may achieve wireless networks having smaller carbon footprints that are cost-efficient and significantly increase system capacity (number of satisfied users). Operational expenses may be reduced through reduced power consumption. Embodiments may also reduce capital expenditures by reducing design costs associated with over provisioning of an always-on control network. Advantages provided by embodiment techniques may be substantially magnified by advances in hardware technology. Aspects may be dynamically adaptive to offered traffic loads, and may be able to control DL and UL operations independently Aspects of this disclosure provide signaling that allows UL measurements from helping UEs to support UE Cooperation. Aspects provide a method for dynamic offloading of data and/or user-specific control traffic jointly with wideband muting of wireless network's TPs for energy efficiency via radio access virtualization (V-RA). Embodiments energy-aware utility formulations may accounts for the power consumption models of different TP types, calculate 'Soft Loading Ratios' for each TP based on predicted traffic load/soft Flow-TP association for only the active flows within the V-RAN. Embodiments may feature a single control parameter, 'Energy Saving Coefficient', for operators to tune the energy savings-performance tradeoff regardless of TP group size, UE pool size, or traffic. Embodiments may support UE cooperation through D2D for UL measurement signals from helping UE(s), and by conducting offloading and multi-point scheduling based on the CQI of either TUE or its best helping UE at the candidate TP(s). Embodiments of this disclosure offer low-complexity optimization techniques that utilized an energy-aware utility in conjunction with a steepest ascent algorithm to perform wideband muting jointly with dynamic multi-point scheduling FIG. 11 illustrates a diagram of a power consumption model discussed in IEEE Wireless Communications article entitled "How much energy is needed to run a wireless network?", IEEE Wireless Communications," which is incorporated by reference herein as if reproduced in its entirety. FIG. 12 illustrates graphs of that power consumption model.

Figure 13:
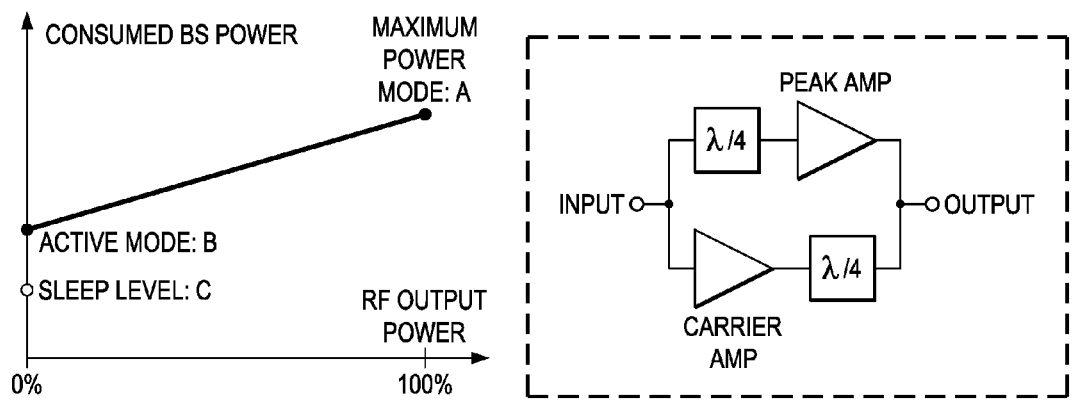
FIG. 13 illustrates a diagram, graph, and chart of a load dependent power consumption model.

FIG. 13 illustrates a diagram, a graph, and a chart of a load dependent power consumption model for base stations. In this model, the radio frequency output powers of the macro and pico base stations are forty watts and one watt, respectively.

Figure 14A:
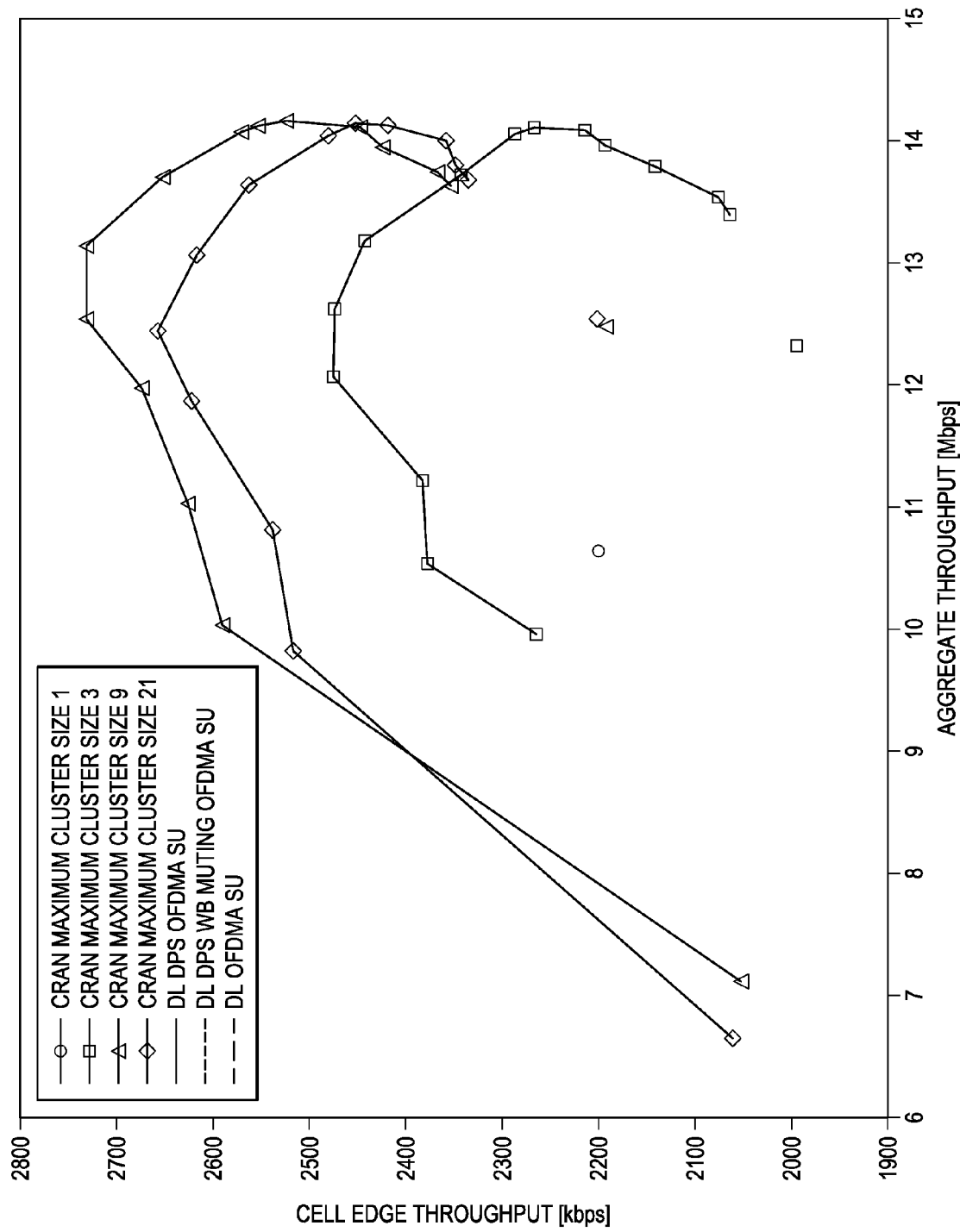
FIGS. 14A-14C illustrate graphs of throughput simulations for embodiment power reduction techniques.
Figure 14B:
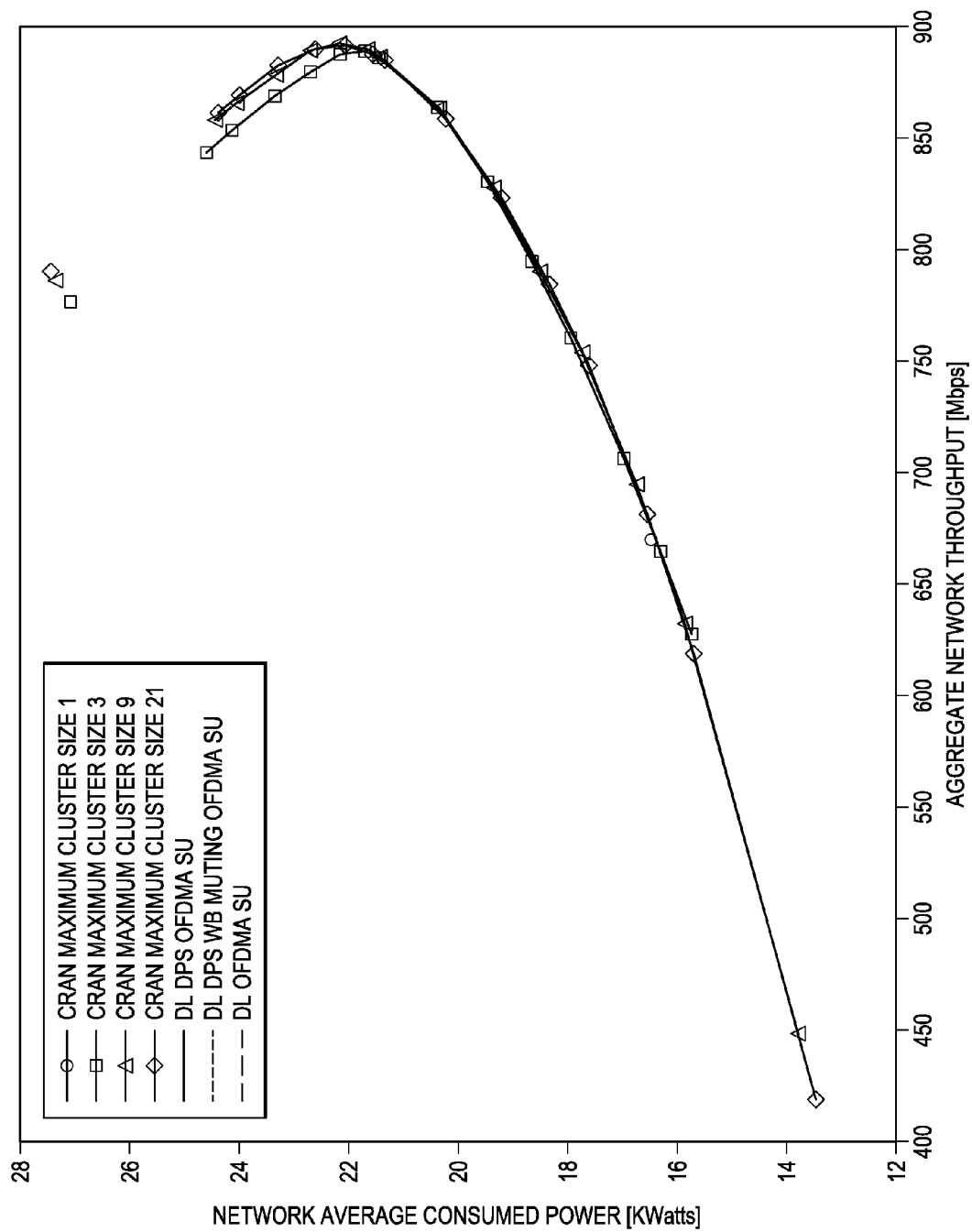
Figure 14C:
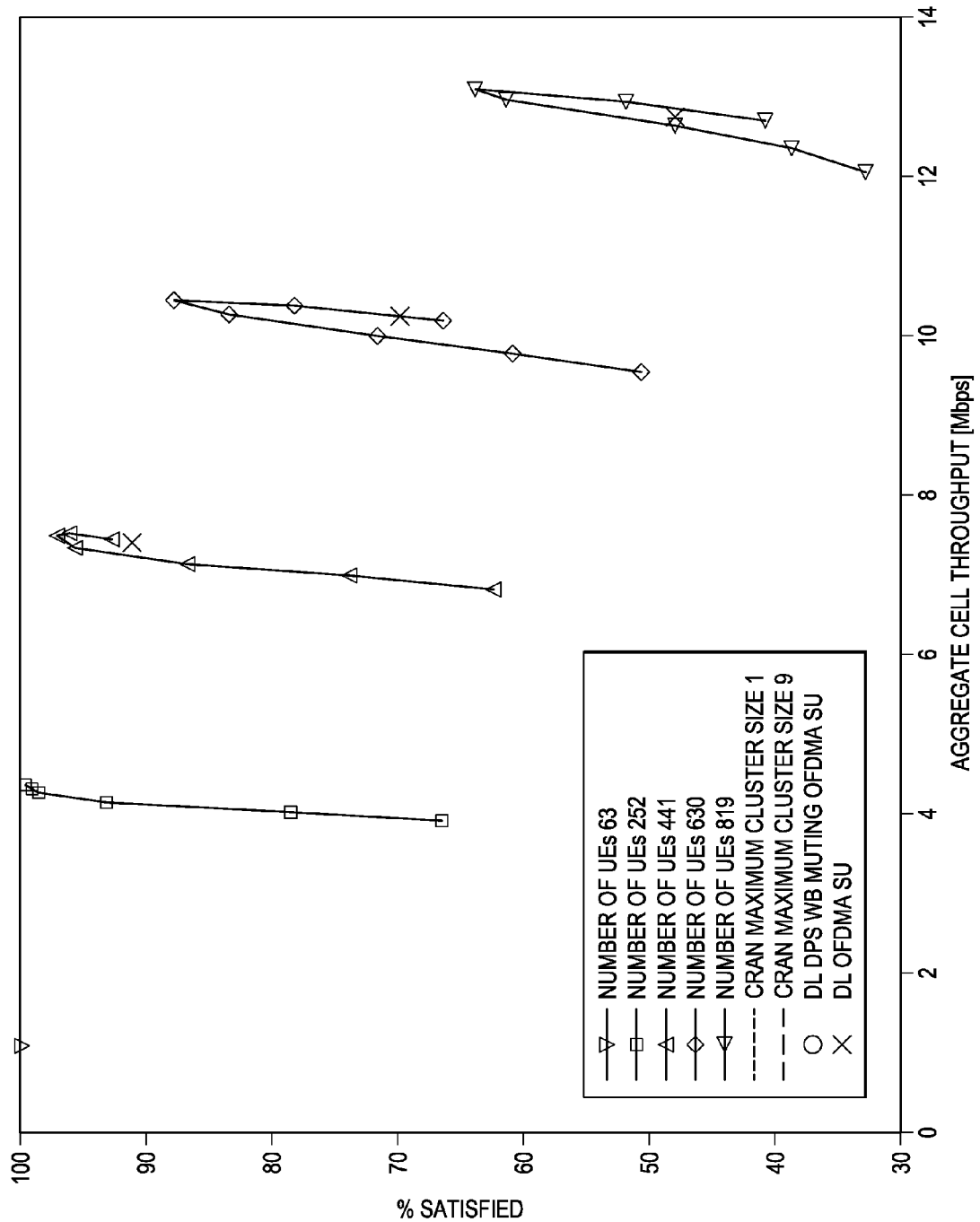
Figure 15:
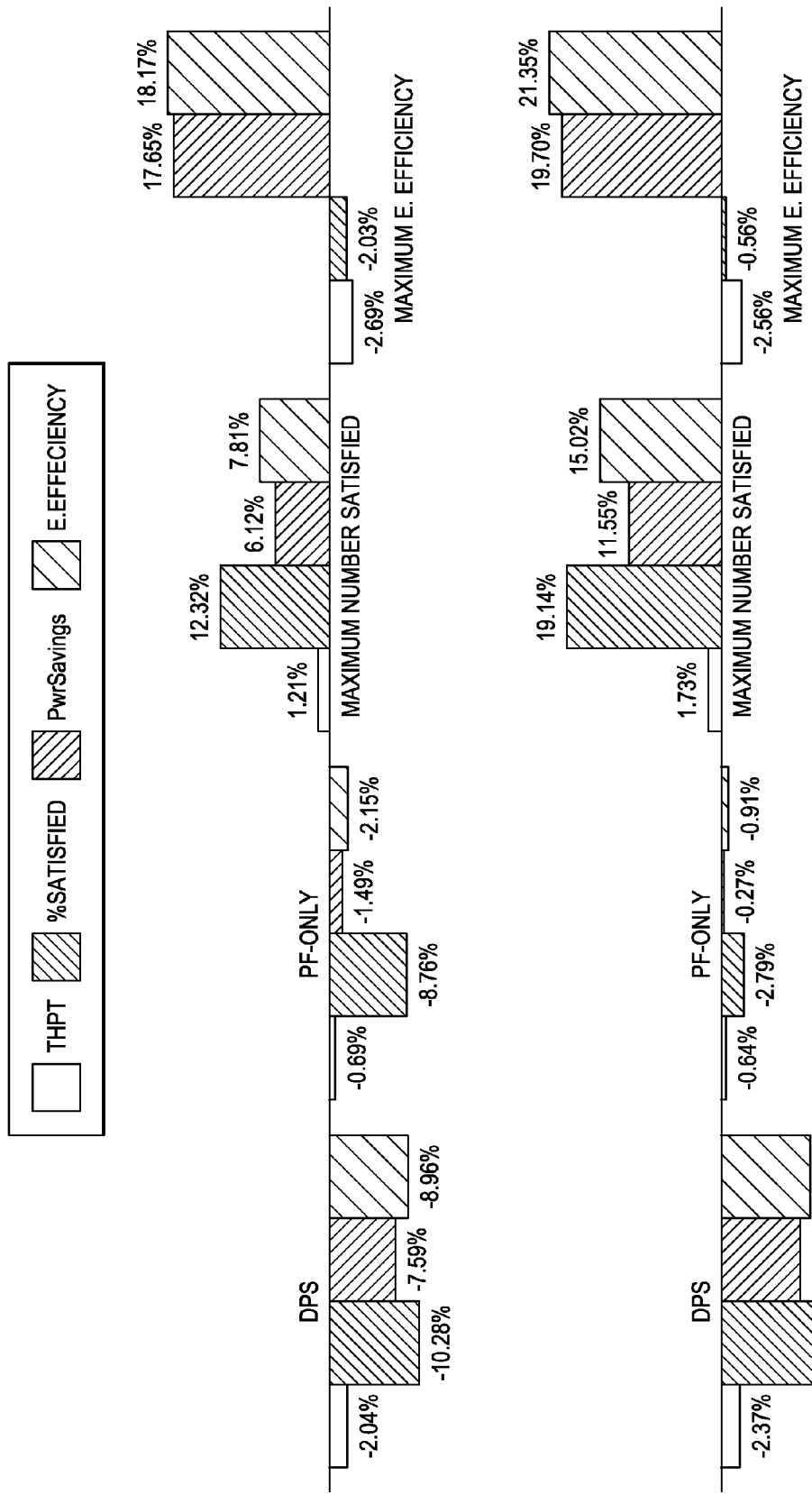
FIG. 15 illustrates a chart of simulation scenario results.

FIGS. 14A-14C illustrate throughput simulations for embodiment techniques of this disclosure. The simulations were created using the following Common Simulation Parameters: CRAN cluster size: 1, 3, 9, and 21 cells; SU MIMO 2×2; Transmit diversity; Maximum transmit base station transmit power of forty watts; Linear model for electrical power consumption using Matlab post-processor (For all schemes, any BS with no scheduled UE, will be considered in a 'sleep mode' and its power consumption will be reduced); B=10 MHz; 10 RBGs; 5 RBs/RBG; Perfect CQI; OLLA wideband fixed. The simulations were created in accordance with the following scenarios: 630 UEs under regular loading; 236 UEs under light loading (⅓ of regular population); UE dropping (based on geometry) both uniform and non-uniform with randomized pattern (In each 3-cell site, one cell is randomly chosen to be the one with the highest density); UE Receiver configured for MMSE; Traffic model was Full buffer with CBR emulation; Simulated Schemes include single cell SU-MIMO; DPS SU-MIMO; Joint Wideband Muting and DPS SU-MIMO; Energy Saving Coefficient of zero (PF-only utility) and {0.1, 0.3, 0.5, 0.7, 0.9, 1, 1.5, 2, 2.5, 3, 4, 5, 10} (Energy-aware muting incentive/turning-on penalty). FIG. 15 illustrates a chart of simulation scenario results.

Figure 16A:
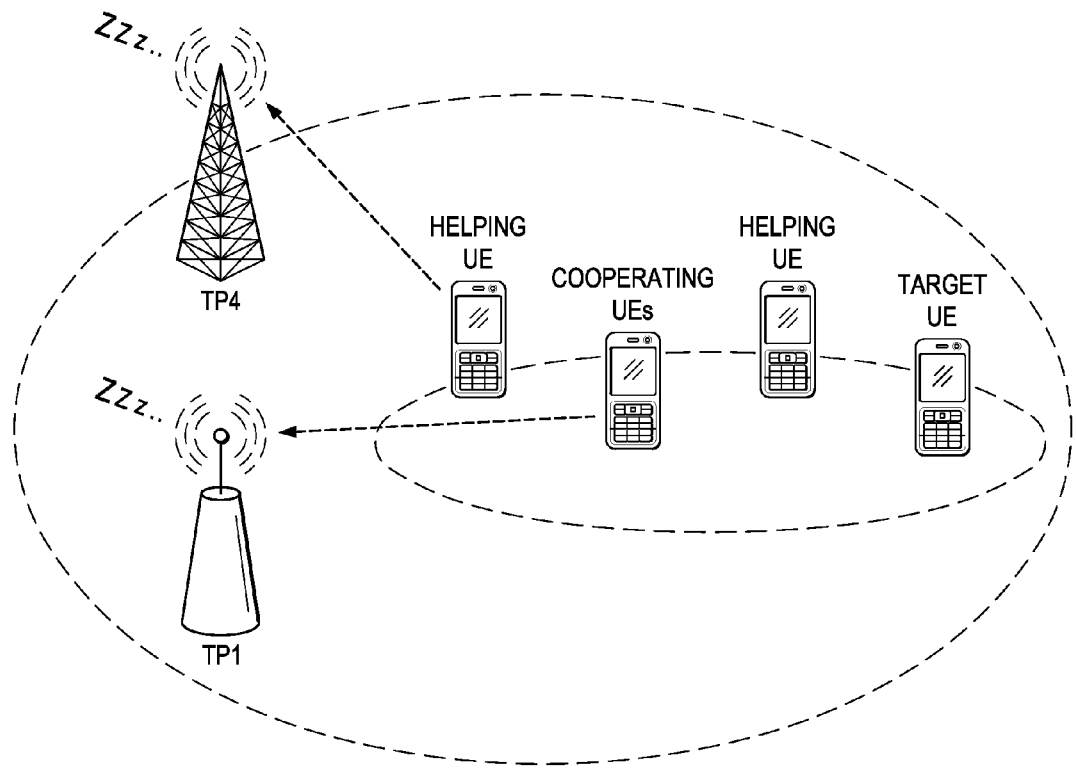
FIGS. 16A-16C illustrate network configurations for transmit point muting and DPS scheduling that leverage device-to-device (D2D) communications.
Figure 16B:
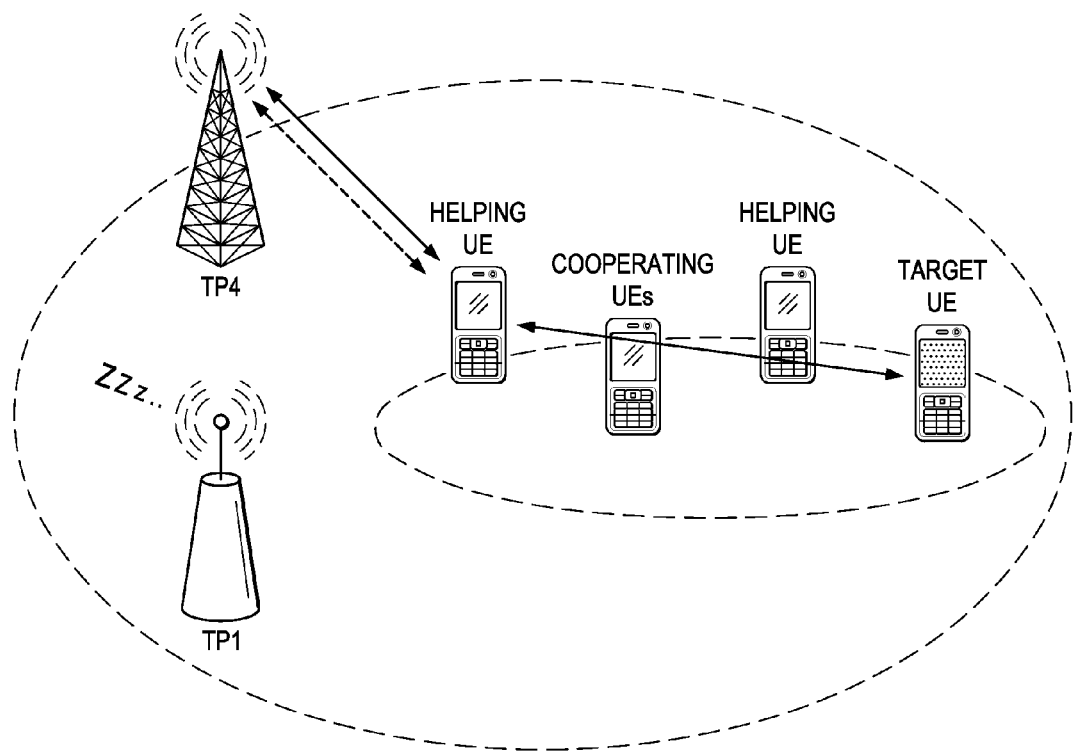
Figure 16C:
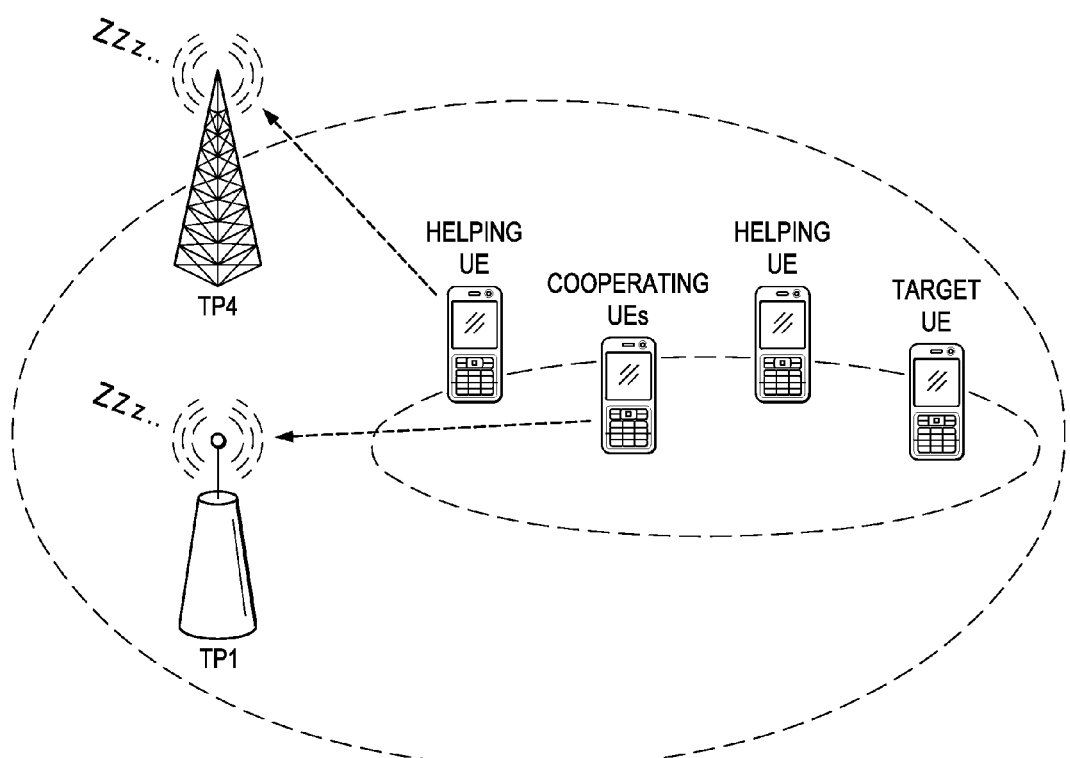

FIGS. 16A-16C illustrate network configurations for TP muting and DPS scheduling that leverage D2D communications between target and helping UEs. Aspects of this disclosure provide signaling mechanisms and reference databases for achieving joint wideband muting and multi-point scheduling. In an embodiment, absolute energy savings may be considered. In this embodiment, at first registration with the network, a TP either signals its power consumption parameters to the central controller or signals an identifier corresponding to its type/Vendor/model in an up-to-date database residing at the central controller or the core network. Procedure can be initiated upon joining a new TP group configuration to inform the new central controller.

In another embodiment, economical/environmental energy savings may be considered in conjunction with the current cost per energy unit. In this embodiment, the TP detects and signals its processor a type of energy being consumed. This detection may be triggered upon initialization and by event-based at switching between sources. The then TP sends type indication to the central controller, who retrieves the current cost per energy unit from an up-to-date local or remote database.

In another embodiment, a higher-layer network management entity sets a 'Energy Saving Coefficient' parameter. Network management decides the performance-savings trade-off by setting and signalling the Energy Saving Coefficient (ESC) for each TP group based on region, day of week, and time of day.

Figure 17:
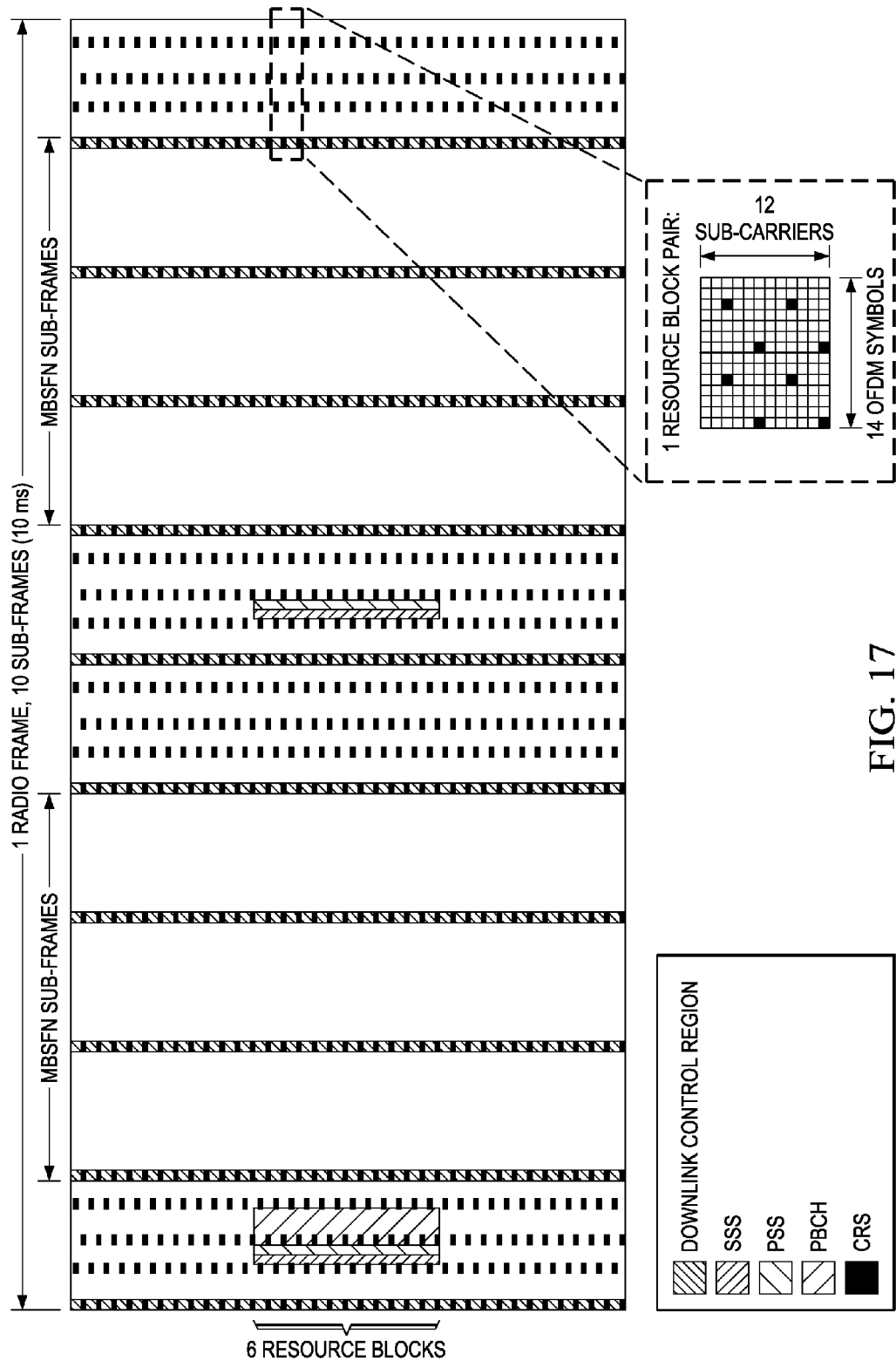
FIG. 17 illustrates a diagram of a Multicast-broadcast single-frequency network (MBSFN) frame structure.

Aspects of this disclosure provide advantages over conventional schemes. FIG. 17 illustrates a Multicast-broadcast single-frequency network (MBSFN) frame structure of conventional DTX schemes. As shown, transmissions are muted in a portion of (e.g., six of ten) MSBFN subframes in a radio-frames to reduce base station power consumption. Details of the DTX scheme are discussed in the Vehicular Technology Conference (VTC) article entitled "Reducing Energy Consumption in LTE with Cell DTX," (2011 IEEE 73rd, vol. 1, no. 5, pp. 15-18, May 2011), which is incorporated by reference herein as if reproduced in its entirety.

Figure 18:
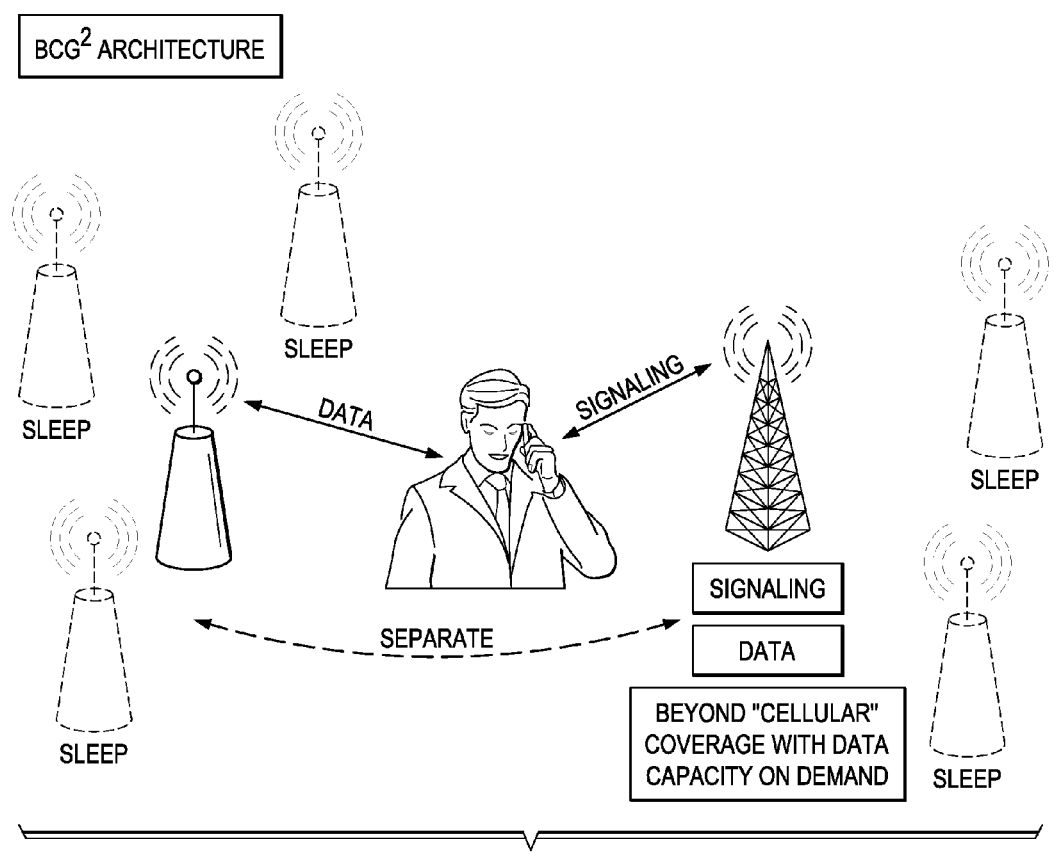
FIG. 18 illustrates a diagram of a conventional Beyond Cellular Green Generation (BCG2) network architecture.

FIG. 18 illustrates a conventional Beyond Cellular Green Generation (BCG2) network architecture in which the network is split into a data-only network, where data transmit points can be activated on demand, and a control-only network where control transmit points are always on. The BCG2 architecture is explained in greater detail by Wireless Communications and Networking Conference Workshops (WCNCW) publication entitled "Energy saving: Scaling network energy efficiency faster than traffic growth," (2013 IEEE WCNCW, vol. 12, no. 17, pp. 7-10 April 2013), which is incorporated by reference herein as if reproduced in its entirety.

Figure 19:
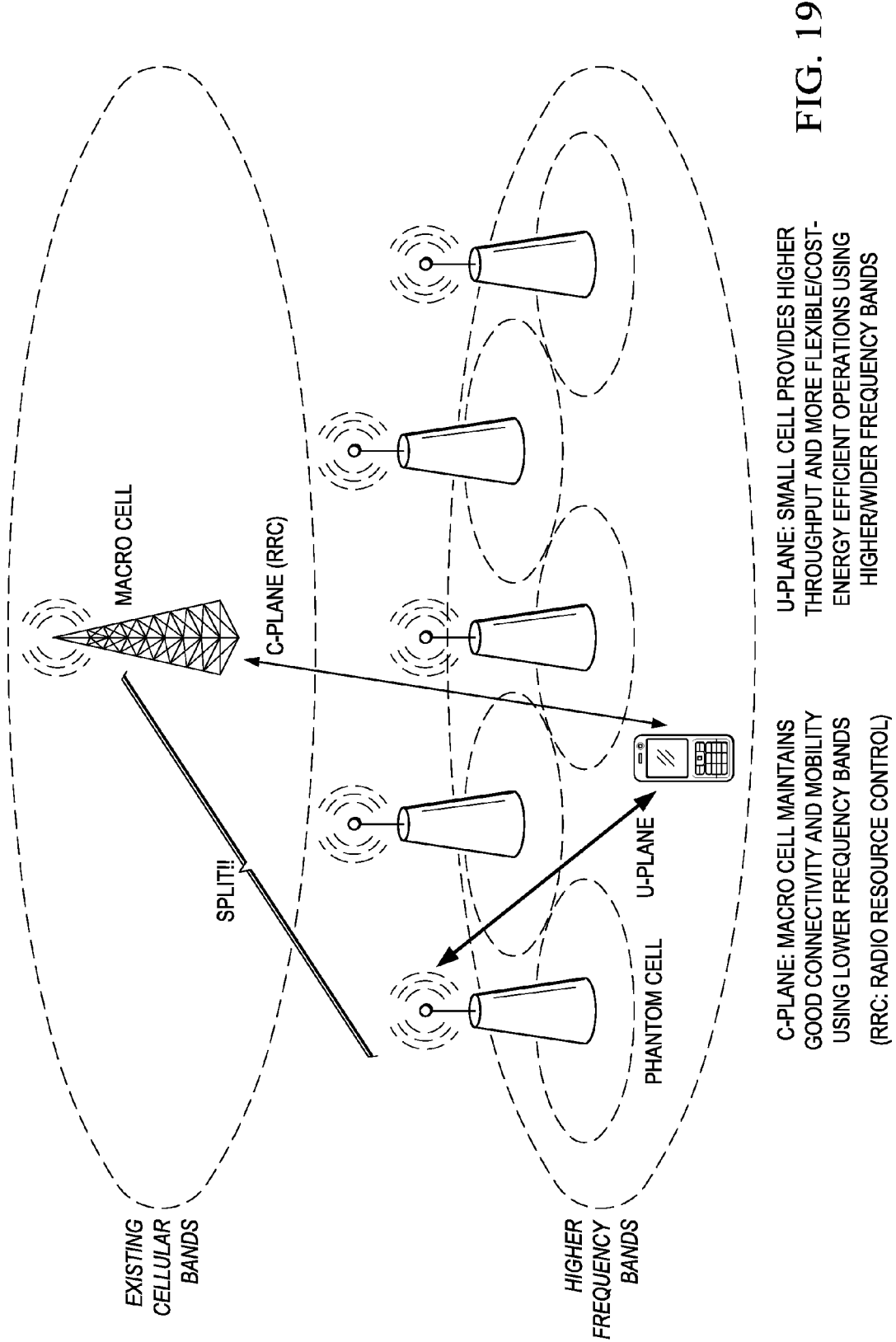
FIG. 19 illustrates a diagram of a conventional phantom cell network architecture.

FIG. 19 illustrates a conventional phantom cell network architecture for a macro-assisted small cell in which the C-plane and U-plane are split between the macro and small cell in different frequency bands. The phantom cell network architecture is explained in greater detail by paper entitled "RAN Evolution Beyond Release 12," (LTE World Summit, 2013), which is incorporated by reference herein as if reproduced in its entirety.

Figure 20:
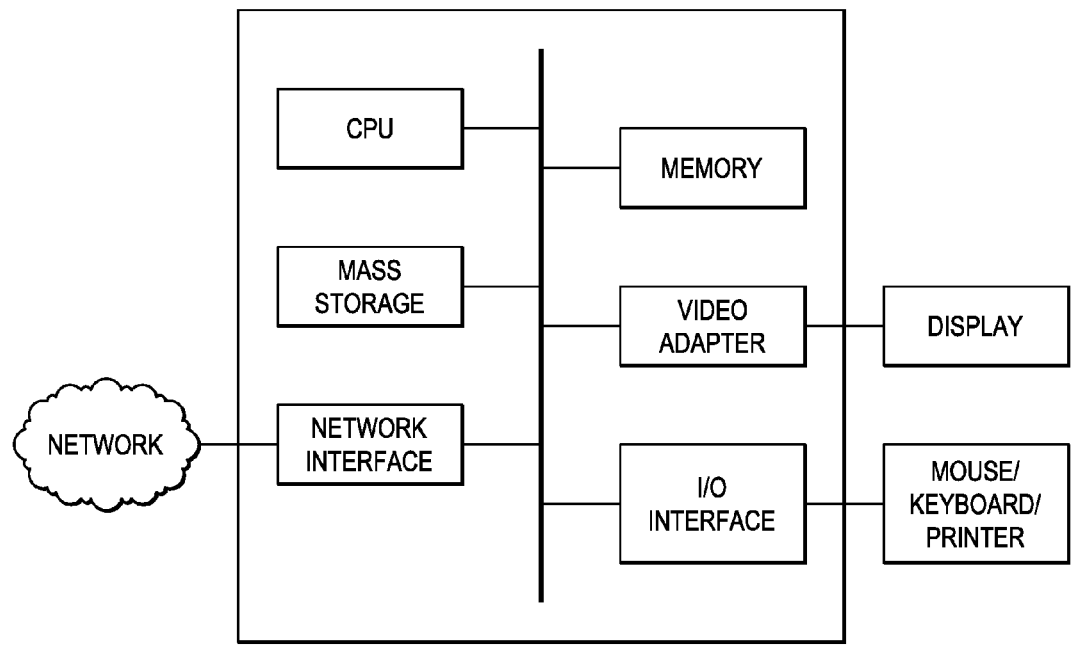
FIG. 20 illustrates a diagram of an embodiment computing platform.

FIG. 20 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 21:
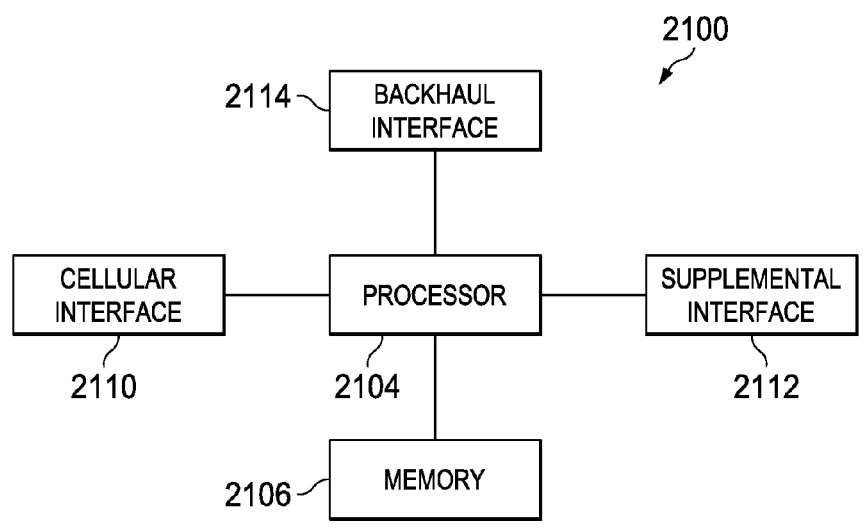
FIG. 21 illustrates a diagram of an embodiment communications device.

FIG. 21 illustrates a block diagram of an embodiment of a communications device 2100, which may be equivalent to one or more devices (e.g., UEs, NBs, etc.) discussed above. The communications device 2100 may include a processor 2104, a memory 2106, a cellular interface 2110, a supplemental interface 2112, and a backhaul interface 2114, which may (or may not) be arranged as shown in FIG. 21. The processor 2104 may be any component capable of performing computations and/or other processing related tasks, and the memory 2106 may be any component capable of storing programming and/or instructions for the processor 2104. The cellular interface 2110 may be any component or collection of components that allows the communications device 2100 to communicate using a cellular signal, and may be used to receive and/or transmit information over a cellular connection of a cellular network. The supplemental interface 2112 may be any component or collection of components that allows the communications device 2100 to communicate data or control information via a supplemental protocol. For instance, the supplemental interface 2112 may be a non-cellular wireless interface for communicating in accordance with a Wireless-Fidelity (Wi-Fi) or Bluetooth protocol. Alternatively, the supplemental interface 2112 may be a wireline interface. The backhaul interface 2114 may be optionally included in the communications device 2100, and may comprise any component or collection of components that allows the communications device 2100 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of energy efficient scheduling through transmit point (TP) wideband muting, the method comprising:
determining an initial scheduling assignment for a cloud radio access network (CRAN) comprising a plurality of access points (APs), the initial scheduling assignment assigning a plurality of user equipments (UEs) to the APs during a time interval;
selecting, from the plurality of APs, at least a first AP to operate in a sleep mode during the time interval, wherein the first AP is wideband muted when operating in the sleep mode, and wherein the initial scheduling assignment assigns UEs in a first subset of UEs to the first AP during the time interval;
re-assigning the UEs in the first subset of UEs to one or more APs in the plurality of APs for at least a portion of the time interval, thereby obtaining a modified scheduling assignment, wherein the one or more APs exclude the first AP; and
instructing the one or more APs to operate in accordance with the modified assignment during the portion of the time interval, wherein the first AP operates in a sleep mode during the portion of the time interval.

2. The method of claim 1, wherein the modified scheduling assignment assigns each of the UEs in the subset of UEs to APs in the one or more APs without assigning any UEs to the first AP.

3. The method of claim 2, wherein the first AP consumes less power when operating in the sleep mode than when operating in an active mode.

4. The method of claim 2, wherein the subset of UEs includes at least one active UE configured to wirelessly communicate data in the CRAN during the time interval, and wherein re-assigning the UEs in the first subset of UEs to other APs in the plurality of APs comprises modifying the initial scheduling assignment to re-assign the at least one active UE from the first AP to a second AP in the plurality of APs during the time interval.

5. The method of claim 4, wherein the initial scheduling assignment assigns the active UE to the first AP during the time interval, and wherein the modified scheduling assignment assigns the active UE to a second AP during the time interval.

6. The method of claim 5, wherein a first wireless channel between the active UE and the first AP provides a higher quality radio connection than a second wireless channel between the active UE and the second AP.

7. The method of claim 6, wherein the first wireless channel supports higher data rates than the second wireless channel.

8. The method of claim 5, wherein a first wireless channel extending between the active UE and the first AP contributes to a greater overall improvement of the sum energy-aware utility than that of a second wireless channel.

9. An apparatus comprising:
a processor; and
a computer readable storage medium storing programming for execution by the processor, the programming including instructions to:
determine an initial scheduling assignment for a cloud radio access network (CRAN) comprising a plurality of access points (APs), the initial scheduling assignment assigning a plurality of user equipments (UEs) to the APs during a time interval;
select, from the plurality of APs, at least a first AP to operate in a sleep mode during the time interval, wherein the first AP is wideband muted when operating in the sleep mode, and wherein the initial scheduling assignment assigns UEs in a first subset of UEs to the first AP during the time interval;
re-assign UEs in the first subset of UEs to one or more APs in the plurality of APs for at least a portion of the time interval, thereby obtaining a modified scheduling assignment, wherein the one or more APs exclude the first AP; and
instruct the one or more APs to operate in accordance with the modified assignment during the portion of the time interval, wherein the first AP operates in a sleep mode during the portion of the time interval.

10. A method for energy efficient scheduling through wideband transmit point (TP) muting, the method comprising:
receiving, by a scheduling device, energy parameters associated with a plurality of access points (APs), wherein the energy parameters indicate an energy type, energy cost, or emission rate associated with energy being used by each of the plurality of APs during a time interval;
determining a scheduling assignment in accordance with the energy parameters associated with the APs, the scheduling assignment assigning a plurality of user equipments (UEs) to the plurality of APs during the time interval, wherein determining the scheduling assignment includes selecting, from the plurality of APs, at least a first AP to operate in a sleep mode during the time interval in accordance with the energy parameters; and
instructing the plurality of APs to operate in accordance with the scheduling assignment during the time interval, wherein the first AP operates in a sleep mode during the time interval.

11. The method of claim 10, wherein determining the scheduling assignment further includes assigning UEs in the plurality of UEs to other APs in the plurality of APs without assigning any UEs to the first AP during the time interval.

12. The method of claim 10, wherein selecting the first AP to operate in a sleep mode during a time interval in accordance with the energy parameters comprises:
identifying power consumption models for each of the plurality of APs;
determining cost components for each of the plurality of APs in accordance with the energy parameters and the power consumption models; and
selecting the first AP to operate in the sleep mode in accordance with the cost components.

13. The method of claim 12, wherein the cost components correspond to environmental costs for operating the APs in an active mode during the time interval.

14. The method of claim 13, wherein each of the environmental costs indicate a carbon emission associated with the energy being used by the corresponding AP.

15. The method of claim 12, wherein the cost components specify energy costs for operating the APs in an active mode during the time interval.

16. The method of claim 15, wherein each of the energy costs indicate an expense for operating the corresponding AP in an active mode during the time interval.

17. The method of claim 16, wherein each of the energy costs indicate an amount of energy needed to operate the corresponding AP in an active mode during the time interval.

18. The method of claim 10, wherein the energy parameters indicate the energy cost associated with energy being used by each of the plurality of APs during a time interval.

19. The method of claim 10, wherein the energy parameters indicate the energy type associated with energy being used by each of the plurality of APs during a time interval.

20. The method of claim 10, wherein the energy parameters indicate the emission rate associated with energy being used by each of the plurality of APs during a time interval.

21. An apparatus comprising:
a processor; and
a computer readable storage medium storing programming for execution by the processor, the programming including instructions to:
receive energy parameters associated with a plurality of access points (APs), wherein the energy parameters indicate an energy type, energy cost, or emission rate associated with energy being used by each of the plurality of APs during a time interval;
determine a scheduling assignment in accordance with the energy parameters associated with the APs, the scheduling assignment assigning a plurality of user equipments (UEs) to the plurality of APs during the time interval, wherein determining the scheduling assignment includes selecting, from the plurality of APs, at least a first AP to operate in a sleep mode during the time interval in accordance with the energy parameters; and instruct the plurality of APs to operate in accordance with the scheduling assignment during the time interval, wherein the first AP operates in a sleep mode during the time interval.

22. A method for low complexity scheduling with wideband transmit point (TP) muting, the method comprising:

computing a first set of scheduling assignments for a cloud radio access network (CRAN) comprising a plurality of access points (APs), the first set of scheduling assignments assigning a plurality of user equipments (UEs) to the plurality of APs during a time interval, wherein each scheduling assignment in the first set of scheduling assignments mutes a different one of the plurality of APs during the time interval;

determining that a first scheduling assignment has a higher utility than other scheduling assignments in the first set of scheduling assignments, wherein the first scheduling assignment specifies that a first AP operates in an sleep mode while remaining APs in the plurality of APs operate in an active mode, the remaining APs in the plurality of APs forming a first subset of APs;

computing a second set of scheduling assignments for assigning the UEs to the APs during the time interval, wherein each scheduling assignment in the second set of scheduling assignments mutes a different AP in the first subset of APs in addition to muting the first AP;

determining that a second scheduling assignment in the second set of scheduling assignment has a higher utility than other scheduling assignments in the second set of scheduling assignments, wherein the second scheduling assignment specifies that a second AP in the first subset of APs operates in a sleep mode while remaining APs in the first subset of APs operate in an active mode, the remaining APs in the first subset of APs forming a second subset of APs; and instructing the plurality of APs to operate in accordance with the second scheduling assignment when a utility of the second scheduling assignment exceeds a utility of the first scheduling assignment by less than a threshold.

23. The method of claim 22, further comprising:

instructing the plurality of APs to operate in accordance with the first scheduling assignment when a utility of the first scheduling assignment exceeds a utility of the second scheduling assignment.

24. The method of claim 22, further comprising:

determining that the utility of the second scheduling assignment exceeds the utility of the first scheduling assignment by more than a threshold;

computing at least a third set of scheduling assignments when, wherein each scheduling assignment in the third set of scheduling assignments mutes a different AP in the second subset of APs in addition to muting both the first AP and the second AP;

selecting a third scheduling assignment having a higher utility than other scheduling assignments in the third set of scheduling assignments, wherein the third scheduling assignment specifies that a third AP in the second subset of APs operates in a sleep mode while remaining APs in the second subset of APs operate in an active mode;

instructing the plurality of APs to operate in accordance with the third scheduling assignment during the time interval when a utility of the third scheduling assignment exceeds the utility of the second scheduling assignment by less than the threshold; and instructing the plurality of APs to operate in accordance with the second scheduling assignment when the utility of the second scheduling assignment exceeds the utility of the third scheduling assignment.

25. The method of claim 22, wherein selecting the first scheduling assignment having a higher utility than other scheduling assignment in the first set of scheduling assignments comprises:

computing a first set of utilities for the first set of scheduling assignments in accordance with a utility function, wherein each utility in the first set of utilities corresponds to a different scheduling assignment in the first scheduling assignment; and determining that a highest utility in the first set of utilities corresponds to the first AP.

26. The method of claim 25, wherein the utility function comprises muting incentive configured to be adjusted to re-balance energy efficiency and performance metrics.

27. The method of claim 26, wherein the muting incentive increases for APs with greater energy or energy cost savings and with less likelihood of being perceived the best serving, among the plurality of APs, by the plurality of active UEs within the time interval.

28. An apparatus comprising:

a processor; and a computer readable storage medium storing programming for execution by the processor, the programming including instructions to:

compute a first set of scheduling assignments for a cloud radio access network (CRAN) comprising a plurality of access points (APs), the first set of scheduling assignments assigning a plurality of user equipments (UEs) to the plurality of APs during a time interval, wherein each scheduling assignment in the first set of scheduling assignments mutes a different one of the plurality of APs during the time interval;

determine that a first scheduling assignment has a higher utility than other scheduling assignments in the first set of scheduling assignments, wherein the first scheduling assignment specifies that a first AP operates in an sleep mode while remaining APs in the plurality of APs operate in an active mode, the remaining APs in the plurality of APs forming a first subset of APs;

compute a second set of scheduling assignments for assigning the UEs to the APs during the time interval, wherein each scheduling assignment in the second set of scheduling assignments mutes a different AP in the first subset of APs in addition to muting the first AP;

determine that a second scheduling assignment in the second set of scheduling assignment has a higher utility than other scheduling assignments in the second set of scheduling assignments, wherein the second scheduling assignment specifies that a second AP in the first subset of APs operates in a sleep mode while remaining APs in the first subset of APs operate in an active mode, the remaining APs in the first subset of APs forming a second subset of APs; and instruct the plurality of APs to operate in accordance with the second scheduling assignment when a utility of the second scheduling assignment exceeds a utility of the first scheduling assignment by less than a threshold.

* * * * *